(12) United States Patent  
Asao

(10) Patent No.: US 7,599,040 B2
(45) Date of Patent: Oct. 6, 2009

(54) COLOR LIQUID CRYSTAL DISPLAY DEVICE

(75) Inventor: Yasufumi Asao, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 299 days.

(21) Appl. No.: 11/117,347

(22) Filed: Apr. 29, 2005

(65) Prior Publication Data

US 2005/0248714 A1    Nov. 10, 2005

(30) Foreign Application Priority Data

May 6, 2004  (JP)  .............. 2004-137505

(51) Int. Cl.
C09K 19/02 (2006.01)
G02F 1/1337 (2006.01)
(52) U.S. Cl. .................. 349/179; 349/130; 349/181; 349/186
(58) Field of Classification Search ............... 349/98, 349/130, 165, 117–119, 177–181, 186
See application file for complete search history.

(56) References Cited

U.S. PATENT DOCUMENTS

| | | | | |
|---|---|---|---|---|
| 4,668,050 A | * | 5/1987 | Aoki et al. | 349/165 |
| 4,946,259 A | * | 8/1990 | Matino et al. | 349/111 |
| 4,996,330 A | * | 2/1991 | Scherowsky et al. | 548/544 |
| 5,750,214 A | | 5/1998 | Ito et al. | 428/1 |
| 5,858,273 A | | 1/1999 | Asaoka et al. | 252/299.4 |
| 5,932,136 A | | 8/1999 | Terada et al. | 252/299.01 |
| 6,083,574 A | | 7/2000 | Asao et al. | 428/1.1 |
| 6,122,031 A | | 9/2000 | Terada et al. | 349/155 |
| 6,128,064 A | | 10/2000 | Moriyama et al. | 349/173 |
| 6,139,927 A | | 10/2000 | Takao et al. | 428/1.26 |
| 6,195,147 B1 | | 2/2001 | Asao et al. | 349/133 |
| 6,310,677 B1 | | 10/2001 | Togano et al. | 349/172 |
| 6,577,289 B1 | | 6/2003 | Asao et al. | 345/87 |
| 6,636,193 B1 | | 10/2003 | Asao et al. | 345/96 |
| 6,650,387 B1 | | 11/2003 | Asao et al. | 349/133 |
| 6,710,842 B2 | | 3/2004 | Munakata et al. | 349/172 |
| 6,757,045 B1 | | 6/2004 | Asao et al. | 349/172 |
| 6,809,717 B2 | | 10/2004 | Asao et al. | 345/102 |
| 7,295,270 B2 | * | 11/2007 | Tashiro et al. | 349/113 |

(Continued)

FOREIGN PATENT DOCUMENTS

JP    4-52625    2/1992

(Continued)

OTHER PUBLICATIONS

Nikkei Electronics, No. 694, pp. 107-108, Jul. 14, 1997 (with English Translation of footnote No. 2).

*Primary Examiner*—Dung T. Nguyen
(74) *Attorney, Agent, or Firm*—Fitzpatrick, Cella, Harper & Scinto

(57) ABSTRACT

A color liquid crystal display device includes a pair of oppositely disposed substrates each of which is provided with an electrode and has been subjected to homeotropic alignment treatment, and chiral nematic liquid crystal disposed between the pair of oppositely disposed substrates. The chiral nematic liquid crystal is capable of causing birefringence leading to a change in brightness and a change in hue depending on a voltage applied between the electrodes. The liquid crystal is twistedly aligned under electric field application to change a twisted angle, so that a fluctuation in birefringence with temperature is compensated.

4 Claims, 15 Drawing Sheets

U.S. PATENT DOCUMENTS

| | | |
|---|---|---|
| 2004/0239612 A1 | 12/2004 | Asao et al. .................. 345/102 |
| 2005/0243047 A1 | 11/2005 | Asao .......................... 345/88 |
| 2005/0248714 A1 | 11/2005 | Asao .......................... 349/179 |
| 2006/0055713 A1 | 3/2006 | Asao et al. .................. 345/690 |

FOREIGN PATENT DOCUMENTS

| | | |
|---|---|---|
| JP | 5-93923 | 4/1993 |
| JP | 2001-272956 | 10/2001 |
| KR | 1995-0020367 | 7/1995 |
| KR | 1998-085576 | 12/1998 |
| WO | 2004/042687 | 5/2004 |

\* cited by examiner (a)

(b)

COLOR LIQUID CRYSTAL DISPLAY DEVICE

FIELD OF THE INVENTION AND RELATED ART

The present invention relates to a color liquid crystal display device capable of effecting multi-color display.

At present, a flat-panel display has widely been popularized as various monitors for a personal computer and the like and as a display device for a cellular phone, and so on. In the future, the flat-panel display is expected to follow popularization more and more, such as development in use for big-screen television.

A most popular flat-panel display is a liquid crystal display. As a color display method for the liquid crystal display, one called a micro-color filter method has been used widely.

The micro-color filter method effects full-color display by constituting one unit pixel with at least three pixels and providing the three pixels with color filters of three primary colors of red (R), green (G), and blue (B), respectively, thus having an advantage of readily realizing a high color-reproducing performance.

On the other hand, as a disadvantage of the micro-color filter method, a transmittance is ⅓ of a monochromatic display method, so that a light utilization efficiency is low.

This low light utilization efficiency leads to a high power consumption of a back light or a front light in a transmission-type liquid crystal display apparatus having the back light or a reflection-type liquid crystal display apparatus having the front light.

On the other hand, as a color liquid crystal display apparatus using no color filter, an electrically controlled birefringence (ECB)-type liquid crystal display apparatus has been known. The ECB-type liquid crystal display apparatus is constituted by a pair of substrates and liquid crystal sandwiched between the substrates, and is roughly classified into those of a transmission-type and a reflection-type.

In the case of the ECB-type liquid crystal display apparatus of the transmission-type, each of the pair of substrates is provided with a polarization plate. On the other hand, in the case of the ECB-type liquid crystal display apparatus of the reflection-type, there are one-polarization plate type display apparatus in which only one of the substrates is provided with a polarization plate and two-polarization plate type display apparatus in which both of the substrates are provided with a polarization plate and a reflection plate is disposed outside each of the polarization plate.

In the case of the ECB-type liquid crystal display apparatus of the transmission-type, linearly polarized light which comes in through one of the polarization plates is changed into elliptically polarized light consisting of respective wavelength light fluxes different in state of polarization by the action of birefringence of liquid crystal layer in a process of transmitting a liquid crystal cell. The elliptically polarized light enters the other polarization plate and the transmitted light having passed through the other polarization plate is colored light consisting of light fluxes of colors corresponding to light intensities of the respective wavelength light fluxes.

The ECB-type liquid crystal display device colors light by utilizing a birefringence action of liquid crystal and a polarization action of the polarization plate, so that it causes no light absorption by the color filter, so that it is possible to effect bright color display at a high transmittance of light. In addition, the birefringence of the liquid crystal layer is changed depending on a voltage applied to the liquid crystal cell. For this reason, by controlling the voltage applied to the liquid crystal cell, it is possible to change the color of the transmitted light or the reflected light. By utilizing this, it is possible to display a plurality of colors at one (the same) pixel.

FIG. 1 is a chromaticity diagram showing a relationship between an amount of birefringence (called retardation R) of the ECB-type display device and coordinates. From FIG. 1, it is found that the color at a retardation R from 0 to about 250 nm is achromatic color since the retardation range is located substantially at a center portion of the chromaticity diagram but is changed when the retardation exceeds the retardation range.

When a liquid crystal material having a negative dielectric anisotropy ($-\Delta\epsilon$) is used as the liquid crystal and liquid crystal molecules thereof are homeotropically (vertically) aligned with respect to the substrates, the liquid crystal molecules are inclined with voltage, so that an amount of birefringence (retardation) is increased with a degree of the inclination of the liquid crystal molecules.

In this case, in a cross-nicol condition, the chromaticity is changed along a curve indicated in FIG. 1. When the voltage is not applied, the retardation R is substantially zero, so that light does not pass through the display device to provide a dark (black) state. With an increase in voltage, brightness is increased in the order of black, gray, and white. When the voltage is further increased, the light is colored to change the color in the order of yellow, red, violet, blue, yellow, violet, light blue, and green.

As described above, under voltage application, the ECB-type display device is capable of changing the brightness between a maximum brightness and a minimum brightness in a modulation range on a low voltage side under and changing a plurality of hues.

As shown in FIG. 1, the color obtained by the change in retardation has a color purity which is considerably lower than those of colors having maximum purities which are located on an outer edge of the chromaticity distribution. As a method of compensating such a low purity, color filter is used in combination with the liquid crystal cell as described in Japanese Laid-Open Patent Application (JP-A) No. Hei 04-05265, whereby the color of ECB display is increased in purity by passing the light through a color filter of the same color. In the method described in JP-A Hei 04-052625, a pixel which is not used for blue display is provided with a red-type color filter or a yellow-type color filter to cut a red (short) wavelength component obtained by the ECB effect, thus providing high-purity red.

Hereinbelow, the range of retardation (0 to 250 nm) in which the brightness is changed in the order of black, gray, and white on the chromaticity diagram is referred to as a "brightness change range", and a range of retardation (not less than 250 nm) in which chromatic color not less than yellow is changed is referred to as a "hue change range". However, a border between the achromatic color and the chromatic color is not determined clearly, so that the border of 250 nm should be understood as a certain index thereof.

Incidentally, in the present invention, the color obtained by retardation (retardation change) is referred to but it means the color along the curve shown in FIG. 1. On the curve, three points at which the purity is maximum are located close to positions where the retardation is 450 nm, 600 nm and 1300 nm, and the color is visually recognized as red, green, and blue, respectively. However, before and after each of the three points, there is a 100 nm-range in which the color is substantially regarded as the corresponding color (red, green or blue), so that in the present invention, the colors in such ranges are also referred to as red, green and blue, respectively. Magenta is located at a point of 530 nm between the ranges of red and blue.

Generally, the color of color filter used in the liquid crystal display apparatus has a higher purity than that obtained by retardation, so that it is located outside the above described chromaticity distribution on the chromaticity diagram shown in FIG. 1. In the present invention, however, such color is also referred to as the same color.

The ECB-type liquid crystal display device is capable of effecting color display but has such a disadvantageous characteristic that a display characteristic is sensitively changed with respect to temperature. As a result, color display with a good reproducibility cannot be effected, so that the disadvantageous characteristic has become an obstacle when a product of the display device is applied. Further, the ECB-type liquid crystal display device has accompanied with such a disadvantage that the number of displayable colors.

Here, temperature-dependency of liquid crystal which produces the ECB effect will be described based on a result of a liquid crystal material having a negative dielectric anisotropy ($-\Delta\in$) ("MLC-6608", mfd. by Merck & Co., Inc.) (Nn-type liquid crystal material).

The liquid crystal material has an amount of birefringence ($\Delta n$) inherent thereto. However, in the liquid crystal cell, an effective birefringence amount ($\Delta n_{eff}$) which actually affects an optical characteristic and is determined also in view of an alignment state of liquid crystal becomes important. For example, assuming that the above described Nn-type liquid crystal material is injected into a liquid crystal device in which it shows a homeotropic (vertical) alignment characteristic under no voltage application and then is placed in a voltage application state, liquid crystal molecules are homeotropically aligned in the state of no voltage application. As a result, an effective birefringence amount ($\Delta n_{eff}$) is zero.

Then, when a voltage which is not less than a threshold voltage is applied, deformation of alignment is caused to occur, so that the liquid crystal molecules are started to be inclined from a direction perpendicular to substrate to an inclination direction. As a result, the resultant effective birefringence amount ($\Delta n_{eff}$) is a finite value, not zero. The value of $\Delta n_{eff}$) is increased with an increasing voltage, saturated in such a state that the liquid crystal molecules are substantially homogeneously aligned, and is kept constant even under application of a voltage exceeding the saturation voltage.

FIG. 2 is a graph showing a relationship between a voltage (V) and an effective birefringence ($\Delta n_{eff}$) of the liquid crystal material (MLC-6608) at 30° C. Referring to FIG. 2, the liquid crystal molecules are started to be inclined at a voltage of not less than the threshold voltage, and a degree of inclination is larger with the applied voltage. When the applied voltage is further increased, the $\Delta n_{eff}$ value is saturated, thus consequently supporting the above described characteristic. Incidentally, the $\Delta n_{eff}$ value can be easily measured by using Berek compensator or Senarmont compensator through a polarizing microscope in a state of applying the voltage to the liquid crystal device.

FIG. 3 is a graph showing a relationship between the applied voltage and the $\Delta n_{eff}$ value at temperatures of 0° C., 10° C., 20° C., 30° C. and 40° C.

As shown in FIG. 3, in a low voltage range having a small slope, the $\Delta n_{eff}$ value has substantially no temperature dependence and is changed with temperature when the applied voltage is close to the saturation voltage (high voltage range).

The temperature dependence (of $\Delta n_{eff}$) on the high voltage side may be attributable to a result of such an alignment state that the liquid crystal molecules are substantially homogeneously aligned with respect to the substrate as described above, resulting in reflection of the temperature dependence of the birefringence of the liquid crystal material itself in a device characteristic as it is.

An ordinary color liquid crystal display device changes the retardation in a brightness change range and produces color by using a color filter. On the other hand, the ECB-type color liquid crystal display device is designed so that a product of $\Delta n_{eff}$ on the high voltage side and a cell thickness d, i.e., a retardation value is in a chromatic color range. In other words, the temperature change of $\Delta n_{eff}$ in the ECB-type color liquid crystal display device manifests itself as a change in color. The change in color is more sensitive to human's eyes than the change in brightness, so that this is a remarkably disadvantageous characteristic compared with the case of the ordinary color liquid crystal display device.

This problem seems to be obviated by increasing the cell thickness since a large retardation can be obtained at the large cell thickness under application of a low voltage. However, when the cell thickness is excessively large, a response speed of liquid crystal is slow, so that the liquid crystal display device is not practically suitable. It is also possible to consider an increase in $\Delta n_{eff}$ but the increased $\Delta n_{eff}$ leads to a narrowed selection range of the liquid crystal material used, so that the increase in $\Delta n_{eff}$ is also less realizable.

Accordingly, preferred solution is to prevent a temperature from fluctuating in an operating voltage range without narrowing the selection range of the liquid crystal material.

When a voltage range in which the $\Delta n_{eff}$ value is not dependent on temperature is enlarged up to a higher voltage range, a resultant cell thickness can be decreased than the original cell thickness. As a result, the response speed is improved. Further, a small cell thickness generally provides a good viewing angle characteristic, thus also contributing to improvement in viewing angle.

SUMMARY OF THE INVENTION

An object of the present invention is to provide a color liquid crystal display device having solved the above described problems.

A specific object of the present invention is to provide a color liquid crystal display device capable of effecting good color display while suppressing temperature dependence of an amount of birefringence.

According to an aspect of the present invention, there is provided a color liquid crystal display device, comprising:

a pair of oppositely disposed substrates each of which is provided with an electrode and has been subjected to homeotropic alignment treatment, and chiral nematic liquid crystal disposed between the pair of oppositely disposed substrates, wherein the chiral nematic liquid crystal is capable of causing birefringence leading to a change in brightness and a change in hue depending on a voltage applied between the electrodes.

The chiral nematic liquid crystal may preferably have a temperature range in which a helical pitch thereof is increased with temperature rise.

The liquid crystal display device may preferably effect black display in no voltage application state. The liquid crystal display device may further preferably comprise a circular polarization plate.

In the above described liquid crystal display device a unit pixel may preferably comprise a plurality of sub-pixels which includes a first sub-pixel capable of display chromatic color by birefringence of the liquid crystal under voltage application, a color filter, and a second sub-pixel for displaying color of the color filter in a brightness change range.

According to another aspect of the present invention, there is provided a color liquid crystal display device, comprising:

a pair of oppositely disposed substrates each of which is provided with an electrode, and liquid crystal disposed between the pair of oppositely disposed substrates, wherein the liquid crystal is capable of causing birefringence leading to a change in brightness and a change in hue depending on a voltage applied between the electrodes, and wherein the liquid crystal is homeotropically aligned with respect to the substrates in a state in which a voltage is not applied between the electrodes and is twistedly aligned in a voltage application state.

The liquid crystal which is twistedly aligned in the voltage application state may preferably have a twist pitch which is increased with temperature rise.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, embodiments of the present invention will be described with reference to the drawings.

In this (basic) embodiment, a liquid crystal display device in which liquid crystal molecules are homeotropically (vertically) aligned when a voltage is not applied is used. In this homeotropic alignment mode, an amount of retardation is always zero in a no voltage application state, so that the retardation has no temperature-dependence.

In the liquid crystal display device in this embodiment, a chiral agent (dopant) is added to a liquid crystal material so that liquid crystal molecules are twistedly aligned when an electric field is applied. In other words, in this embodiment, chiral nematic liquid crystal is used as the liquid crystal material for the liquid crystal display device.

Figure 4:
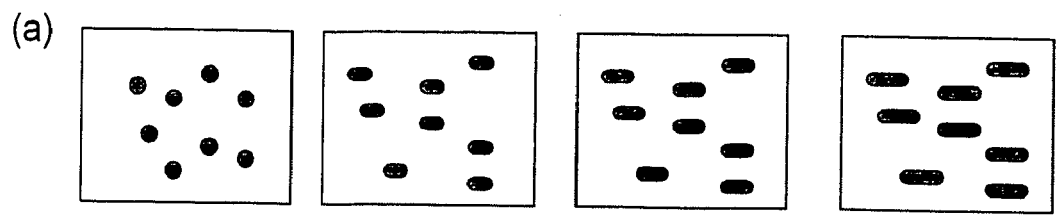
FIGS. 4(a) and 4(b) are schematic views showing an ordinary alignment state (FIG. 4(a)) and a twisted alignment state (FIG. 4(b)), of liquid crystal molecules.
Figure 4:
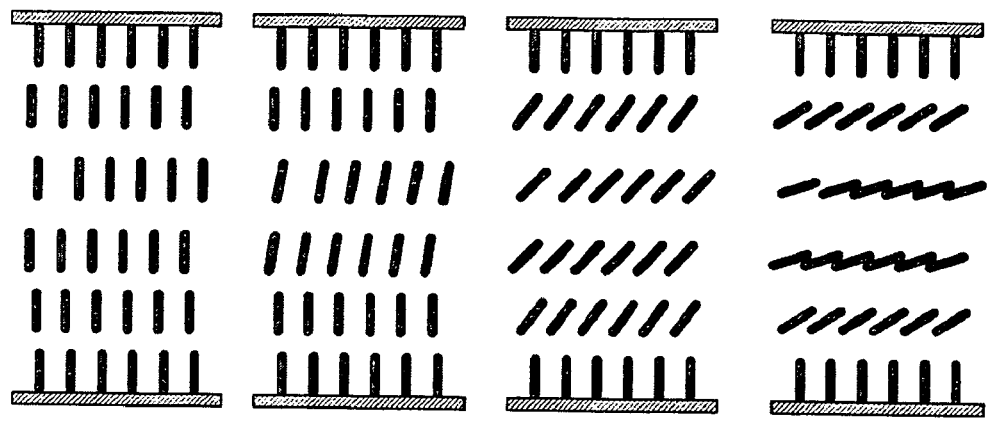
Figure 4:
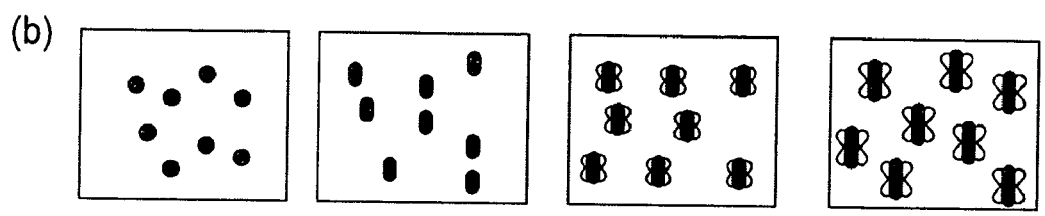
Figure 4:
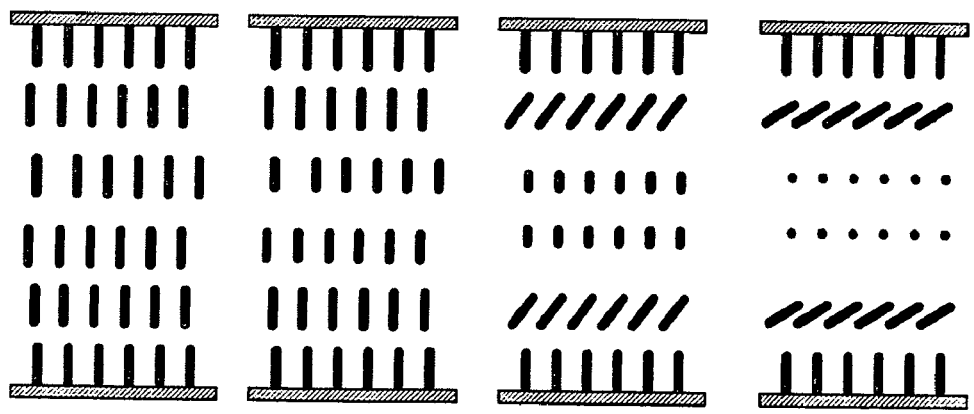

FIGS. 4(a) and 4(b) schematically illustrate alignment states of the liquid crystal molecules, wherein each upper-side view shows an alignment state when viewed from above a substrate surface, and each lower-side view shows an alignment state in vertical cross section. In each of FIGS. 4(a) and 4(b), a leftmost view shows an alignment state when an electric field (voltage) is not applied, and other views show alignment states when an applied voltage is gradually increased toward a rightmost view.

In the case where the chiral agent is not added to base liquid crystal, the liquid crystal molecules are substantially homeotropically (vertically) aligned with respect to the substrates under no voltage application. When the voltage is applied, as shown in FIG. 4(a), the liquid crystal molecules are inclined in one direction with no twist.

On the other hand, in the case where the chiral agent is added to the base liquid crystal, the liquid crystal molecules are substantially homeotropically aligned with respect to the substrates under no voltage application, similarly as in the case of not adding the chiral agent to the base liquid crystal. However, when the voltage is applied, as shown in FIG. 4(b), the liquid crystal molecules are placed in such an alignment state that a direction of inclination of the liquid crystal molecules, i.e., an inclination direction thereof is continuously changed from the neighborhood of the upper substrate to the neighborhood of the lower substrate, due to a helical structure of the liquid crystal itself (hereinafter, this alignment state is referred to as a "twisted alignment state").

When the liquid crystal molecules are placed in the twisted state, a refractive index with respect to transmitted light is different depending on a distance from the substrate and is averaged, so that an effective optical (refractive index) anisotropy ($\Delta n_{eff}$) is small compared with the case where the liquid crystal molecules are inclined in one direction.

A twisted angle of the liquid crystal molecules in the twisted alignment state between the pair of (upper and lower) substrates can be adjusted by changing a helical pitch of the liquid crystal. The helical pitch can be arbitrarily controlled by changing a concentration of the chiral agent blended with the base liquid crystal.

When the liquid crystal has a long helical pitch, the twisted angle in the twisted alignment state between the substrates is small. On the other hand, when the liquid crystal has a short helical pitch, the twisted angle is large. As a result, a degree of an anisotropy with respect to light passing through the liquid crystal layer, i.e., an effective retardation ($\Delta n_{eff} \times d$, d: cell thickness) is smaller as the helical pitch is shorter.

In many cases, the helical pitch of the liquid crystal material into which the chiral agent is added becomes shorter with a decrease in temperature, so that a temperature change of $\Delta n_{eff}$ by the changing in helical pitch in such a change that $\Delta n_{eff}$ becomes smaller at a lower temperature.

On the other hand, nematic liquid crystal generally has a small thermal fluctuation at low temperature to increase a degree of order and a large thermal fluctuation at high temperature to decrease the degree of order. As a result, at low temperature, a local refractive index anisotropy is large, and on the other hand, the refractive index anisotropy is small at high temperature. In other words, the temperature change by the degree of order of the nematic liquid crystal is such that the local optical anisotropy is larger on a lower temperature side.

Accordingly, by selecting the chiral agent so as to provide a long helical pitch at high temperature, it is possible to offset the effects of both the change in helical pitch and the order of nematic liquid crystal each other.

Incidentally, it is possible to select a display state, of the liquid crystal display device, which is a bright (white) state or a dark (block) state under voltage application, depending on a position of polarization plate(s). However, in the case of the twisted alignment state, when the display state at the time of voltage application is the dark (black) state, it is necessary to effect phase compensation in order to provide a transmitted light intensity of zero over a wide wavelength range. For this reason, a constitution for that purpose becomes complicated. Accordingly, in the case of the twisted state, a so-called normally black constitution such that black display is effected when the voltage is not applied is preferred.

Next, in order to realize multi-color display, it is possible to use a method in which the pixels are combined with a color filter as described below.

More specifically, as shown in FIG. 5(a), one pixel 50 is divided into a plurality of sub-pixels (two sub-pixels in this case) 51 and 52, and one sub-pixel 51 is provided with a green color filter G. At the remaining sub-pixel 52, by adjusting a retardation, a change in luminance from black to white and display of any color from red to blue through green are achieved. More specifically, a unit pixel is constituted by a first sub-pixel at which chromatic color is displayed by changing the retardation of the liquid crystal layer under voltage application and a second sub-pixel at which the color filter is provided and the color of the color filter is displayed by changing the retardation in a brightness change range through voltage. At the pixel for displaying green having a high luminosity factor, the green color filter G is used without utilizing an ECB-based coloring phenomenon. Further, the ECB-based coloring phenomenon is utilized for only red and blue.

For example, the green (G) pixel provided with the green color filter is placed in the dark state and a transparent pixel provided with no color filter is placed in the white (bright) state (a maximum luminance state in a change area of achromatic color), whereby it is possible to display white at the pixels as a whole.

Alternatively, it is also possible to place the G pixel in a maximum transmission state and place the transparent pixel in a magenta (display) state in the chromatic color area. The magenta includes both red (R) and blue (B), so that it is possible to attain white display as the result of color composition.

In order to provide the single color of green (G), the G pixel is placed in the maximum transmission state and the transparent pixel is placed in the dark state. In order to provide the single color of red (R) (or blue (B)), the G pixel is placed in the dark state and the transparent pixel is adjusted to provide a retardation of 450 nm (or 600 nm).

By using the above methods in combination, it is also possible to obtain mixed color of R and G or B and G.

Both at the G pixel and the transparent pixel, it is possible to effect black display by providing these pixels with a retardation of zero to be placed in the dark state.

In the constitution of the present invention, at the G pixel, the retardation is changed in the range of 0-250 nm and at the transparent pixel, the retardation is changed both in the range of 0-250 nm and the range of 450-600 nm. At both the sub-pixels, the liquid crystal material is ordinarily used in common, so that a drive display range is set to be different between the sub-pixels.

As a result of selection of the green color filter, it is possible to obviate production of green through adjustment of retardation, so that it is not necessary to increase the cell thickness. Further, green has a high luminosity factor, so that a high purity color is produced by the green color filter to improve an image quality.

The above described embodiment of the present invention is characterized in that green is displayed at the G pixel through the green color filter and other colors are displayed by the colors produced by a medium itself (the liquid crystal in the above embodiment), so that the present invention is also applicable to another medium in addition to the liquid crystal. More specifically, the present invention is applicable so long as a medium is changed in optical property by external modulation means and has a modulation area in which a brightness is changed by the modulation means and a modulation area in which a hue is changed.

Specific examples of such a medium are described later. In the present invention, the display device is constituted by using the medium and the unit pixel is constituted by the transparent first sub-pixel and the second sub-pixel provided with the color filter. At the first sub-pixel, modulation for changing the hue in a predetermined range is performed to effect display of the color in the predetermined range, and at the second sub-pixel, modulation within the brightness change range is performed to change the brightness of the color filter. In order to display the achromatic colors of black, gray, and white, it is sufficient to perform the modulation within the brightness change range at the transparent first sub-pixel.

Figure 1:
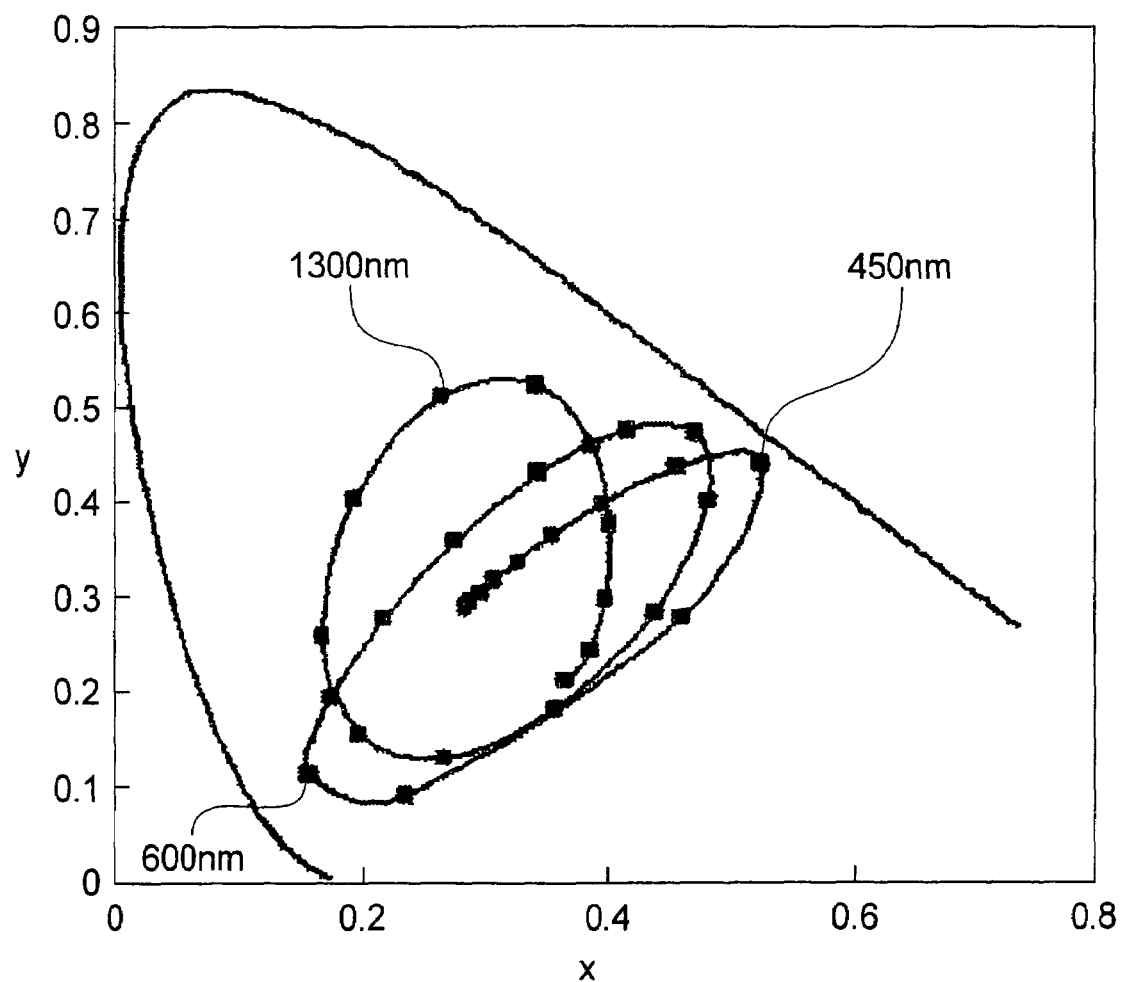
FIG. 1 is a chromaticity diagram showing a change in color when a retardation is changed.
Figure 2:
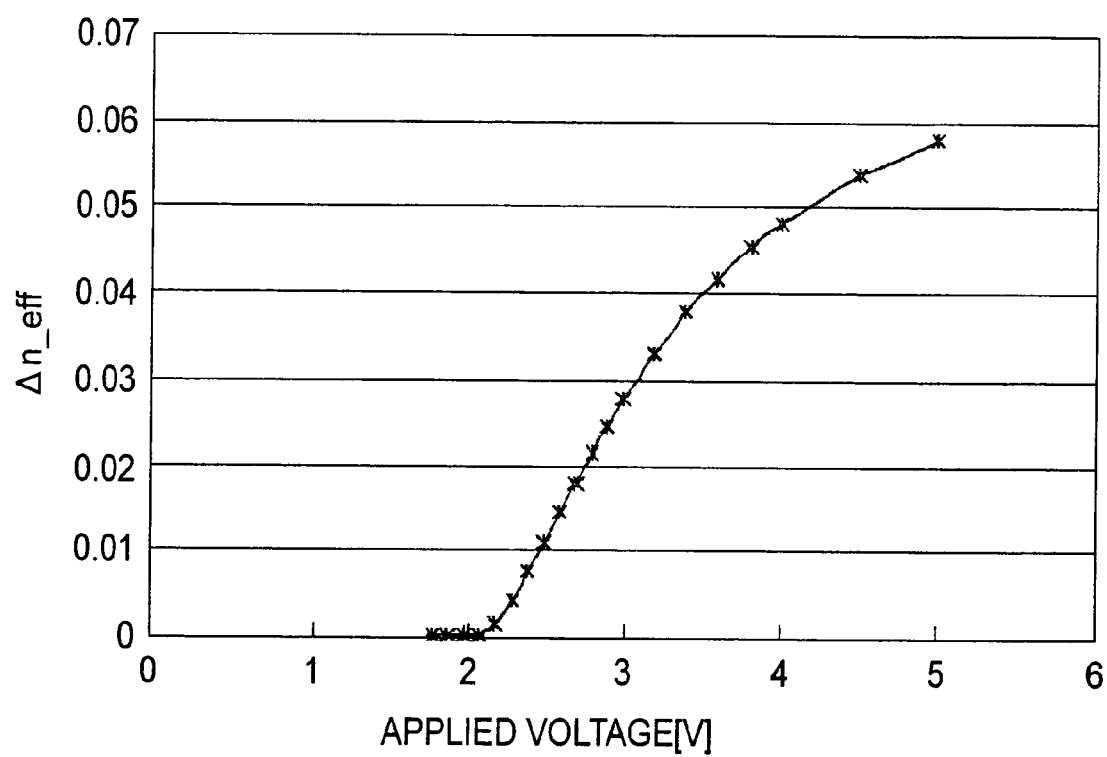
FIG. 2 is a graph showing a voltage-dependence of an effective birefringence amount at 30° C.
Figure 3:
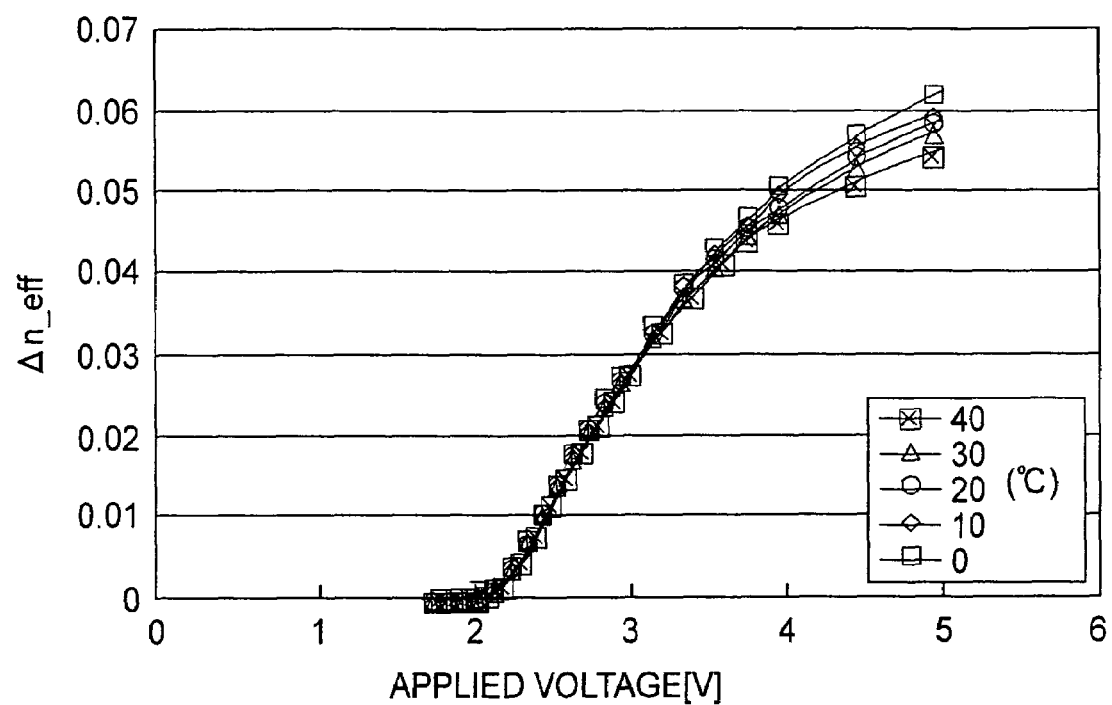
FIG. 3 is a graph showing a voltage-dependence of an effective birefringence amount when a temperature is changed.

By using the above described constitution, it is unnecessary to provide an excessively large cell thickness compared with a liquid crystal display device which effects display of three primary colors only by the ECB principle. In FIG. 1, red corresponds to the retardation of 450 nm and blue corresponds to the retardation of 600 nm, so that the liquid crystal display device used is only required to have a cell thickness so as to realize the retardation of 600 nm. In the case of the above embodiment, the cell thickness required is about 10 μm. When such a degree of the cell thickness is used, an increase in response speed is small, e.g., about 150 msec, so that it becomes possible to effect motion picture display although blur is somewhat caused to occur.

Further, in the case where the above described constitution is applied to a reflection-type liquid crystal display device, the cell thickness if ½ of the above described liquid crystal display device, so that the response speed is ¼, i.e., not more than 40 msec. As a result, the reflection-type liquid crystal display device is capable of effecting motion picture display at a level of practically no problem.

Further, a color reproduction range of green is determined by the color filter and green has the high luminosity factor, so that it becomes possible to realize a high color reproducibility without sacrificing a transmittance of a white component.

(Gradation Display)

Figure 5:
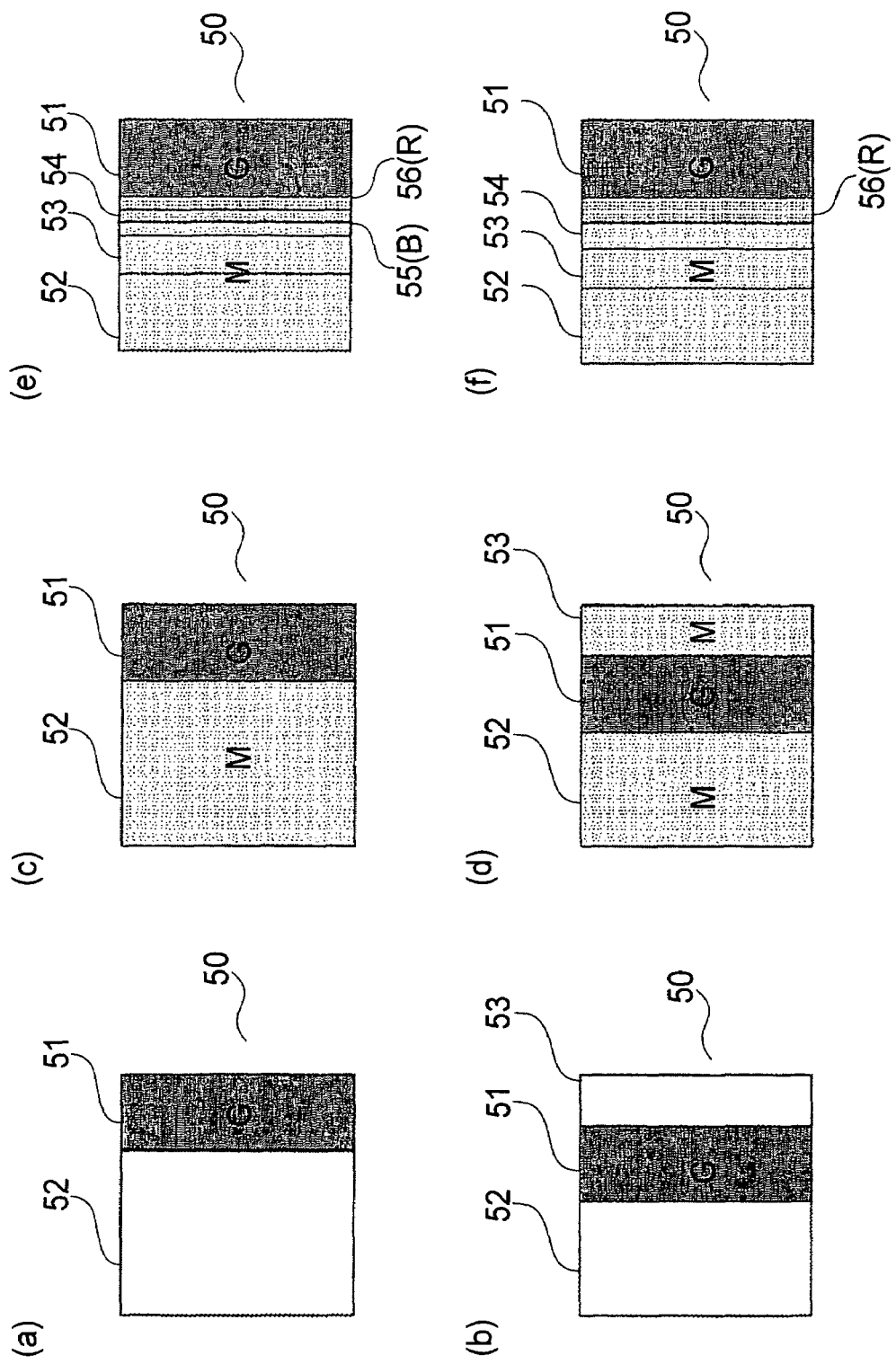
FIGS. 5(a) to 5(f) are schematic views each showing a pixel structure of one pixel according to an embodiment of the liquid crystal display device of the present invention.

In the liquid crystal display device shown in FIG. 5, at the green pixel having a high luminosity characteristic, it is possible to effect continuous gradation display but at the transparent pixel, the chromatic color states, i.e., blue and red, utilize the ECB-based coloring phenomenon, thus failing to effect gradation display.

FIG. 5(b) shows one pixel structure which is improved in gradation characteristic compared with that shown in FIG.

5(a), wherein the transparent pixel (52 of FIG. 5(a)) is divided into a plurality (two) of sub-pixels 52 and 53 to have different areas, whereby gradation is displayed in a digital manner.

The sub-pixels have different areas, so that some halftone levels can be displayed depending on the area of sub-pixel to be turned on for displaying corresponding color.

When there are N sub-pixels in this case, it is possible to obtain a gradation display characteristic with high linearlity by dividing the N sub-pixels into a plurality of portions of at an areal ratio of $1:2:\ldots:2^{N-1}$. Incidentally, in the embodiment shown in FIG. 5(b), N=2.

In the liquid crystal display device of the present invention, digital gradation is used for only red and blue which have a low luminosity characteristic. At the green pixel, continuous modulation is performed in the retardation range of 0-250 nm, whereby continuous gradation levels can be displayed. For this reason, human's eyes do not feel that a gradation characteristic is largely impaired, so that it is possible to obtain a relatively good color image. In other words, the present invention is also characterized in that it becomes possible to provide a sufficient characteristic even at the limited number of gradation levels by using the digital gradation for only red and blue which have a small number of gradation levels detectable by human's eyes. As in this embodiment, in order to provide a sufficient gradation characteristic with limited gradation levels, a pixel pitch may preferably be small. More specifically, from the viewpoint of such a resolution that a human cannot recognize the pixel, the pixel pitch may preferably be not more than 200 μm.

As described above, the liquid crystal display device of the present invention employs the display method utilizing the coloring phenomenon based on the ECB effect with respect to red and blue. For this reason, it is possible to considerably decrease light loss compared with the case of using respective color filters of red and blue. As a result, it is possible to provide a display device with a higher light utilization efficiency than that of the case of such a method that three primary colors are displayed only by the conventional RGB color filter. Accordingly, when the liquid crystal display device of the present invention is used as the reflection-type liquid crystal display device, such as paper-like display or electronic paper.

On the other hand, even in the case of using the liquid crystal display device of the present invention in the above described display mode as the transmission-type liquid crystal display device, a transmittance of the liquid crystal layer is high. As a result, power consumption, of the back light, required to provide the same luminance value as in the conventional one may be low. For this reason, the transmission-type liquid crystal display device may suitably be used from the viewpoint of low power consumption of the back light.

Further, the display device of the present invention can be used for motion picture display since it has high liquid crystal responsiveness. Conventionally, with respect to liquid crystal display device for television purpose, there has been proposed such a method, called a "pseudo impulse drive", that a shutoff period of the back light is provided in one frame period in order to realize a crisp motion picture characteristic, e.g., in JP-A No. 2001-272956. By the method, there arises such a problem that a lowering in luminance by an amount corresponding to the shutoff period of the back light is caused to occur. To such a television use, the display device having the above described display mode providing a high response speed and a high transmittance is also applicable.

The color display device of the present invention may also be suitably applicable to a projection-type display device requiring a high light utilization efficiency.

Modified Embodiment

In the above described embodiments, analog gradation is realized by the color filter with respect to green display and digital gradation is realized, during display of red and blue, by utilization of the coloring phenomenon based on the ECB effect and the display method based on the pixel division method with respect to red and blue. The above described embodiments may suitably be applied to the use of high definition display device in order to provide a sufficient gradation characteristic even at the limited number of gradation levels with respect to display of red and blue.

On the other hand, in the reflection-type liquid crystal display device as described above, there is also a use requiring a high transmittance and more display colors. Further, in the transmission-type liquid crystal display device capable of effecting full-color display, there have also been a requirement with respect to a high-transmittance display mode in order to suppress the power consumption of the back light while retaining a full-color display performance. In addition thereto, there are many requirements with respect to such a display mode capable of effecting full-color display with high light utilization efficiency.

In order to meet the above described requirements, on the basis of the color display device described above, other methods (schemes) capable of effecting multi-color display will be explained.

The methods includes the following methods (1), (2) and (3):

(1) a method in which the coloring phenomenon based on the ECB effect is also utilized at a retardation other than those for red and blue, (2) a method in which continuous gradation color in a low retardation range at the pixel provided with the color filter of color complementary to green is utilized, and (3) a method in which a pixel provided with either one of color filters for green and blue is added.

Modified Embodiment 1

Figure 8:
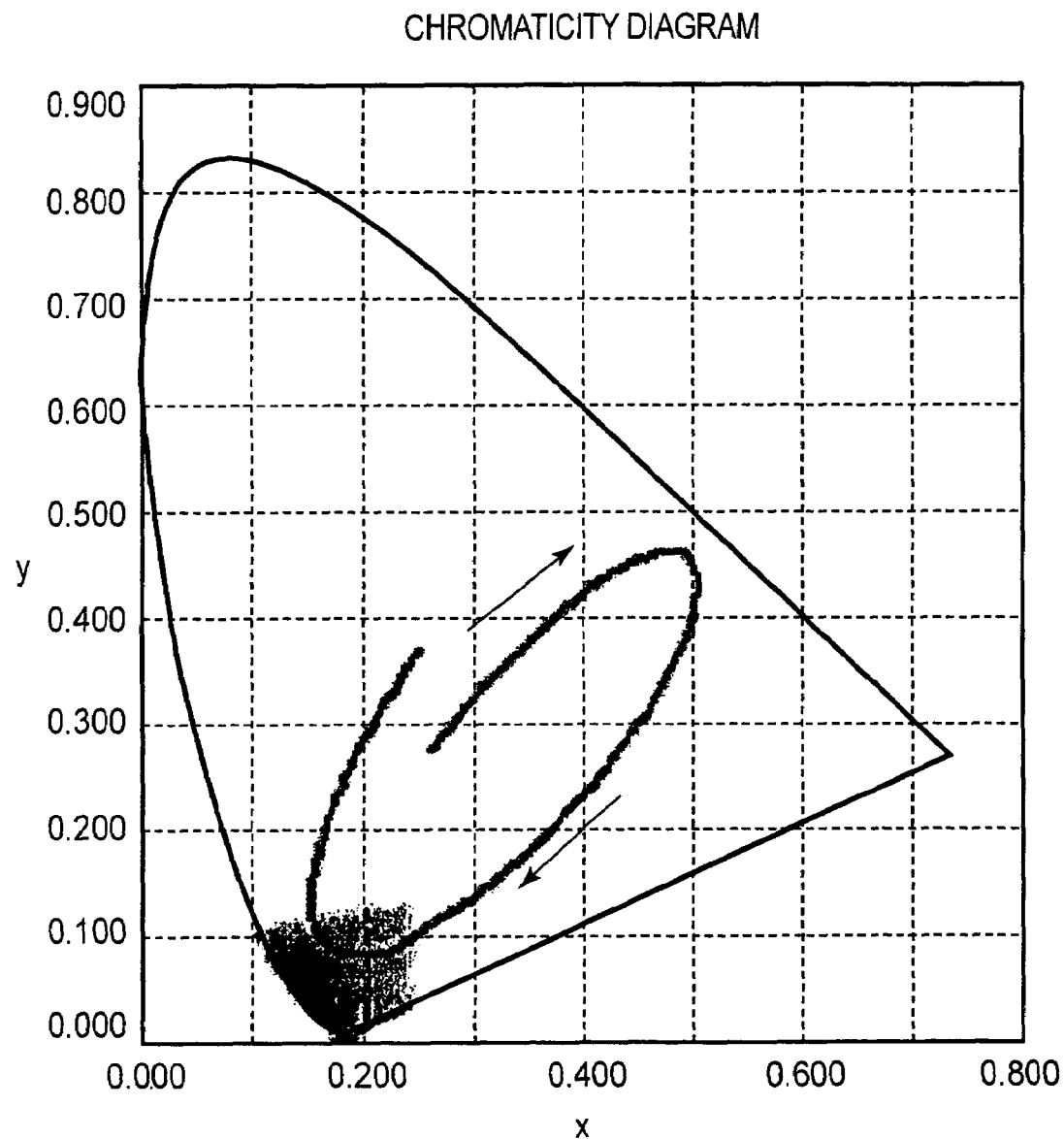
FIG. 8 is a chromaticity diagram showing a change in color when a retardation is changed in the liquid crystal display device of the present invention.

Method (1) Utilizing ECB Effect-Based Coloring Phenomenon at Retardation Other than Those for Red and Blue In the above described embodiment, the principle of effecting the display of red and blue by utilizing the coloring phenomenon on the basis of the ECB effect. In the coloring phenomenon based on the ECB effect, as shown in FIG. 8, it is possible to change the hue continuously from white to blue. More specifically, there are many available display colors other than red and blue described above. By using such display colors, it becomes possible to represent display colors larger in number than those described above.

More specifically, a change in display color under the above described cross-nicol condition in such a constitution that the first sub-pixel is not provided with the color filter will be described. As shown by the arrows indicated in FIG. 8, such a change in brightness of achromatic color that the display state is changed from the black state to the white state via the pray (halftone) state with an increase in brightness from zero is caused to occur. Further, in a retardation range exceeding the white range, it is possible to continuously change various chromatic colors as in the order of yellow, yellowish red, red, reddish violet, violet, bluish violet, and blue.

By combining the achromatic color range with the green pixel, it is also possible to effect bright green display. Further, by combining the effect bright green display. Further, by combining the colors in the chromatic color range with the green pixel, halftone color may be displayed.

Further, with respect to the resultant chromatic colors, similarly as in the case of red and blue, it becomes possible to represent the digital gradation by the above described constitution. As a result, it is possible to represent many more display colors.

Modified Embodiment 2

Method (2) Utilizing Continuous Gradation Color in Low Retardation Range at Pixel Provided with Color Filter of Color Complementary to Green In the case where the first sub-pixel is no provided with the color filter as in the above described basic embodiment and Modified Embodiment 1, in a retardation range exceeding the white range, such a change in hue in the order of yellow, yellowish red, red, reddish violet (magenta), violet, bluish violet, and blue is achieved. In this modified embodiment, the first sub-pixel to be colored by the retardation change is provided with a color filter of color, such as magenta, complementary to green. As a result, it becomes possible to considerably enlarge the color reproduction range of red and blue.

FIGS. 5(c) and 5(d) show pixel constitutions in this modified embodiment. A G pixel 51 is provided with a green color filter similarly as in the basis embodiment. Further, first sub-pixels 52 and 53, which are transparent in the basic embodiment and Modified Embodiment 1, are provided with a magenta color filter. In FIG. 5(a), one first sub-pixel 52 is used, and in FIG. 5(d), two first sub-pixels 52 and 53 are used. At a second sub-pixel (G pixel) 51, similarly as in the above described first embodiment, modulation is performed in a modulation brightness change modulation range to change the brightness of green, and at the first sub-pixels 52 and 53, modulation is performed in a hue change modulation range to display chromatic color and modulation is performed in the brightness change modulation range to effect display of changing the brightness of magenta.

Figure 9:
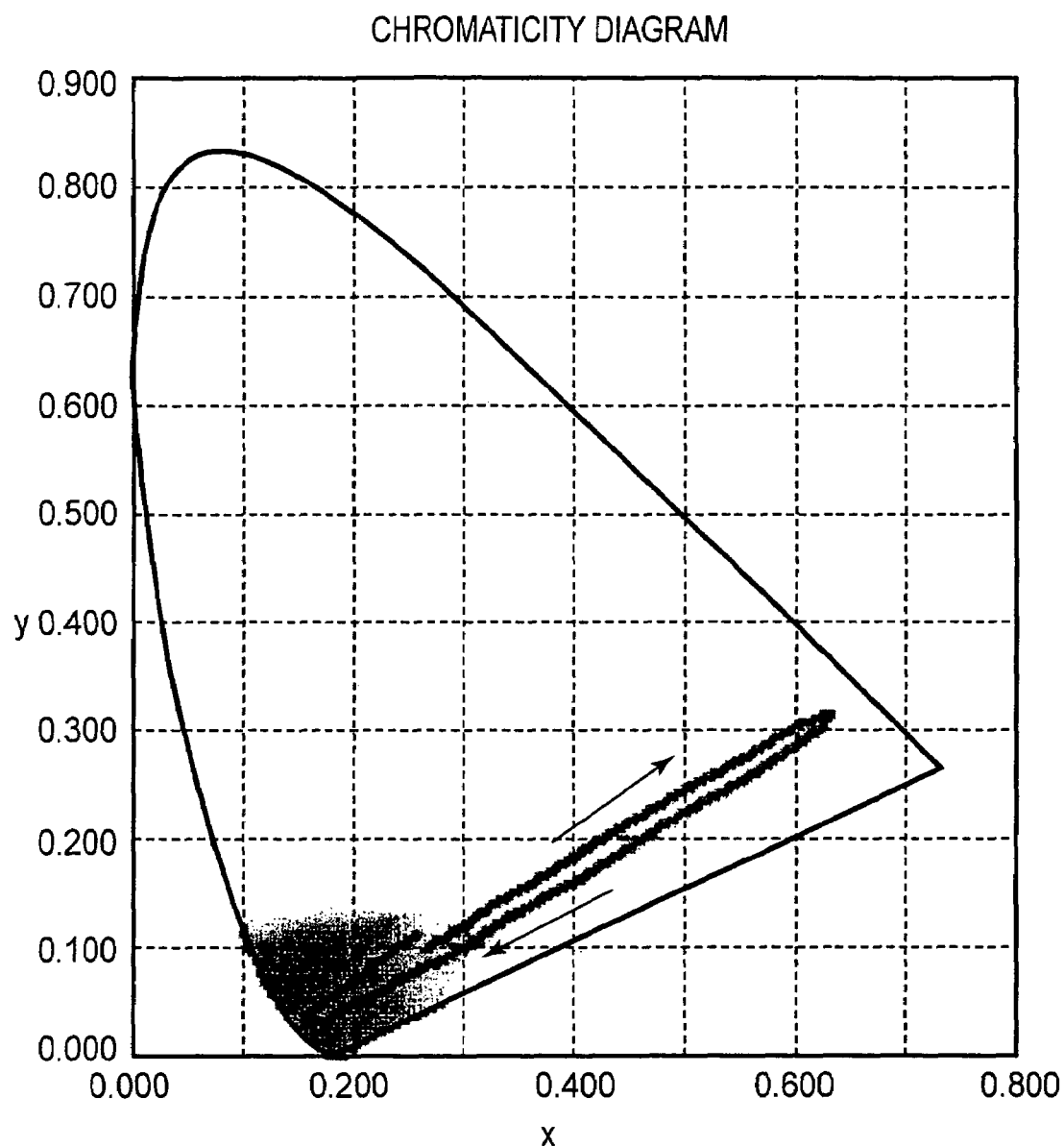
FIG. 9 is a chromaticity diagram showing a change in color when a retardation is changed in the liquid crystal display device of the present invention provided with a color filter of color complementary to green.

FIG. 9 shows calculated values with respect to a change in color by retardation in the case where an ideal magenta color filter which provides a transmittance of zero in a wavelength range of 480-580 nm and a transmittance of 100% in other ranges. As the retardation amount is increased from zero, such a brightness change of chromatic color that the display state is changed from the black state to a bright magenta state via a dark magenta state (halftone magenta state) is achieved. Thereafter, when the retardation amount is further increased and exceeds the white range in the above described embodiment in which the first sub-pixel is not provided with the color filter, a continuous change in chromatic color in the order of magenta, red, reddish violet (magenta), violet and blue is achieved.

Compared with FIG. 8, the range of change in chromaticity is extended near to pure colors of red and blue (located corners of chromaticity diagram), so that it is found that the color reproduction ranges of red and blue are extended by providing the magenta color filter. Further, the change from red to blue is moved along the lower side (of color triangle), so that it is also found that a continuous change in color mixture from red to blue is achieved. In this manner, it is possible to enlarge the color reproduction ranges of red and blue by providing the magenta color filter and achieve the continuous change in halftone when the retardation is changed.

In order to white in this embodiment, the same retardation value (250 nm) providing a maximum transmittance is set both at the magenta pixels (first sub-pixels) 52 and 53 and the G pixel 51. Alternatively, it is also possible to place the G pixel 51 in the maximum transmittance state (retardation value: 250 nm) and the magenta pixels 52 and 53 in an intermediary state between red and blue (retardation value: about 550 nm). In the former case, in order to change the brightness of achromatic color, the retardation of magenta pixel is changed with the retardation of the green color filter pixel so that their gradation levels are changed together.

The cases of displaying black, the single chromatic color of RGB, and the mixed color of these colors are the same as in the basis embodiment described above.

The gradation representation in the case where the magenta pixel is divided into two sub-pixels is similar to that in the case of FIG. 5(b) in the basis embodiment.

According to this modified embodiment, by using the color filter of color, such as magenta, which is complementary to green, it is possible to represent gradation of the color complementary to green, so that the number of displayable colors can be remarkably increased.

Further, the magenta color filter permits transmission of both of red and blue, so that it is possible to effect bright display compared with the conventional method using the red color filter and the blue color filter in combination.

Modified Embodiment 3

Method (3) Adding Pixel Provided with Either One of Color Filters for Red and Blue FIG. 5(e) shows a pixel constitution this modified embodiment, wherein a third sub-pixel 55 provided with a blue color filter B and a fourth sub-pixel 56 provided with a red color filter R are added to the G pixel 51 described in Modified Embodiment 2 and magenta pixels 52, 53 and 54 (arranged at an areal ratio of 4:2:1).

The display actions at the G pixel and magenta pixels are the same as in the above described embodiments. At the G pixel, the brightness of green is continuously displayed by performing the modulation in the low retardation range. At the magenta pixels, continuous modulation is performed in the same retardation range or the colors of red, blue and halftones therebetween are displayed in the layer retardation range of chromatic color.

At the third and fourth sub-pixels 55 and 56, similarly as in the G pixel, modulation is performed in the retardation range of 0-250 nm, whereby the brightnesses of blue and red are continuously changed. This function will be described below.

Figure 10:
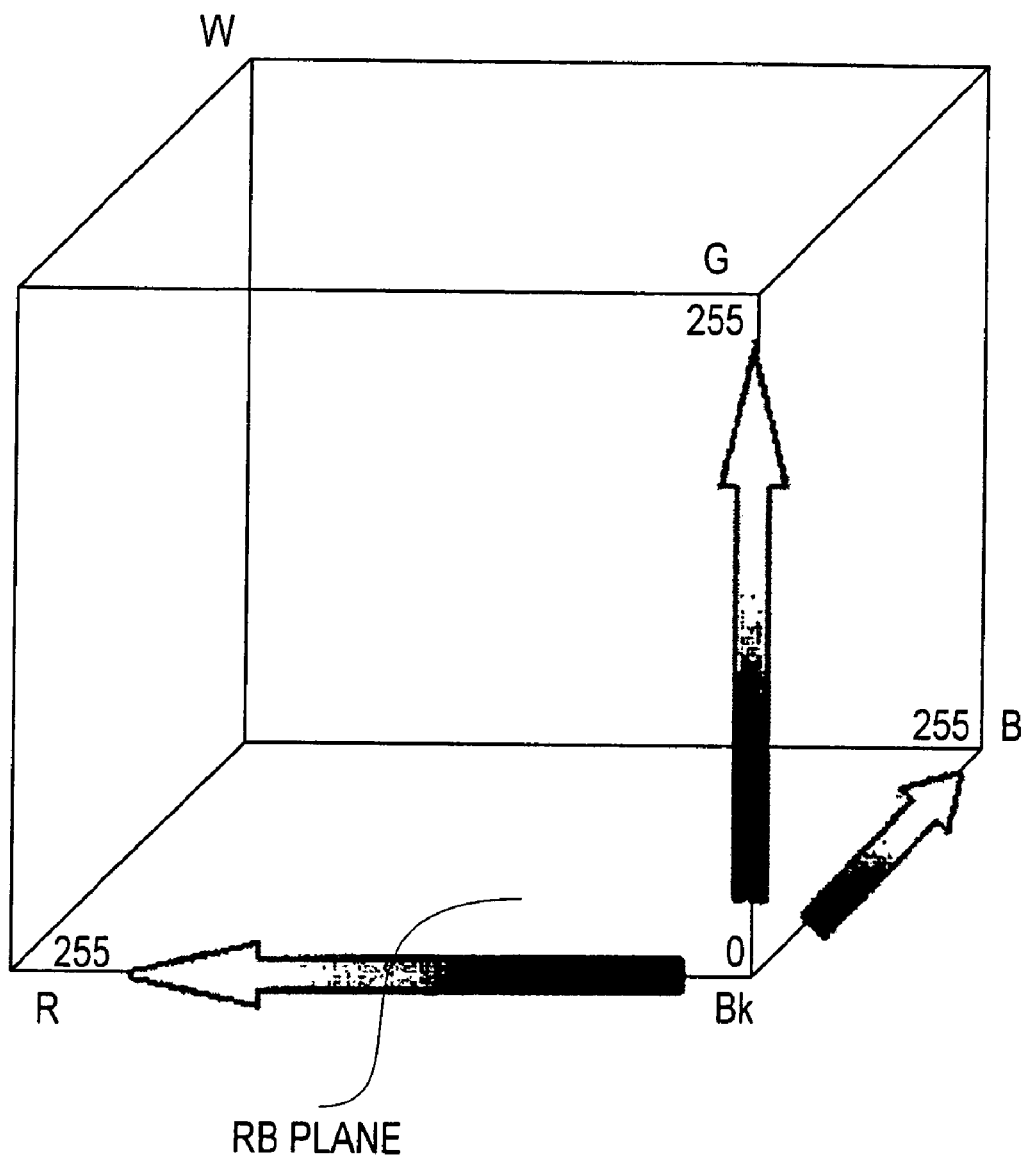
FIG. 10 is a conceptual view showing a full-color display range in the liquid crystal display device of the present invention.

FIG. 10 shows displayable colors in RGB additive process, wherein an arbitrary point in a cube represents a color mixture state of red, green, or blue corresponding to an associated coordinate, and a vertex represented by "Bk" shows a state of a minimum brightness. When image information signals of red (R), green (G) and blue (B) are supplied, a display color corresponding to a position (point) of the sum of independent vectors of R, G and B each extended from the vertex "Bk". Vertexes "R", "G" and "B" represent maximum brightness states of red, green and blue, respectively. A vertex "W" represents a white display state at a maximum brightness. A length of one side of the cube is 255 in this embodiment.

In the color display device of the present invention, with respect to green (G), the continuous gradation display is effected by the color filter, so that display color may be located at any point in a green direction. For this reason, in the following description with respect to the display color, the display color in a plane constituted by red and blue vectors (hereinafter referred to as a "RB plane").

Figure 11:
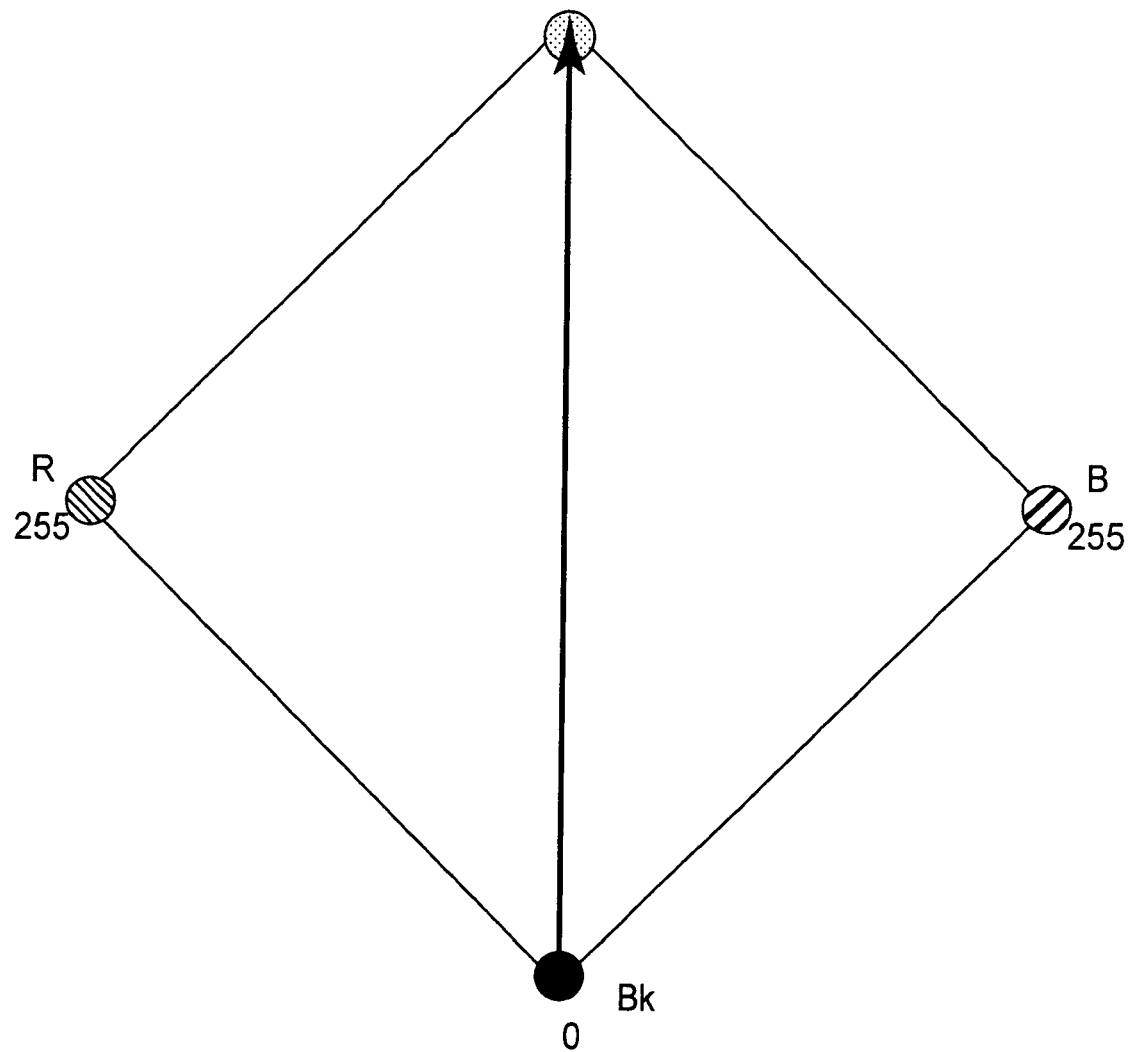
FIGS. 11 to 15 are schematic views each showing displayable colors in red-blue (RB) plane in the liquid crystal display device of the present invention.

First of all, the case where a pixel utilizing the coloring phenomenon based on the ECB effect is one (the case of no pixel division) will be described with reference to FIG. 11. FIG. 11 shows a RB plane. During red display and blue display, the coloring phenomenon based on the ECB effect is utilized, so that available states as bright and dark states are two values of "ON" and "OFF". Accordingly, available points on each of R-axis and a B-axis are two points representing a maximum value and a minimum value. On the other hand, in the case of the constitution described in Modified Embodiment 2, i.e., the case where the color filter of magenta complementary to green is provided, it is possible to change the brightness of magenta by changing the retardation at the magenta pixel in the range of 0-250 nm. Accordingly, the display color in this range corresponds to that a continuous change in brightness is achieved on an axis indication of a synthetic vector of red and blue. More specifically, in FIG. 11 in Modified Embodiment 2, any point selected from the point "Bk", the points "R" and "B", and those on the arrow can be utilized as the display color.

Next, the case where the pixel utilizing the coloring phenomenon based on the ECB effect is divided into two sub-pixels in an areal ratio of 1:2 will be described with reference to the RB plane shown in FIG. 12. In this case, similarly as in the case of no pixel division, the coloring phenomenon based on the ECB effect is utilized during the red display and the blue display, so that available dark and bright display states are two values of "ON" and "OFF" for each of the divided pixels. Further, one pixel is divided into two sub-pixels at the areal ratio of 1:2, so that four points indicated by circles are available on each of the axis-R and the axis-B.

Figure 12:
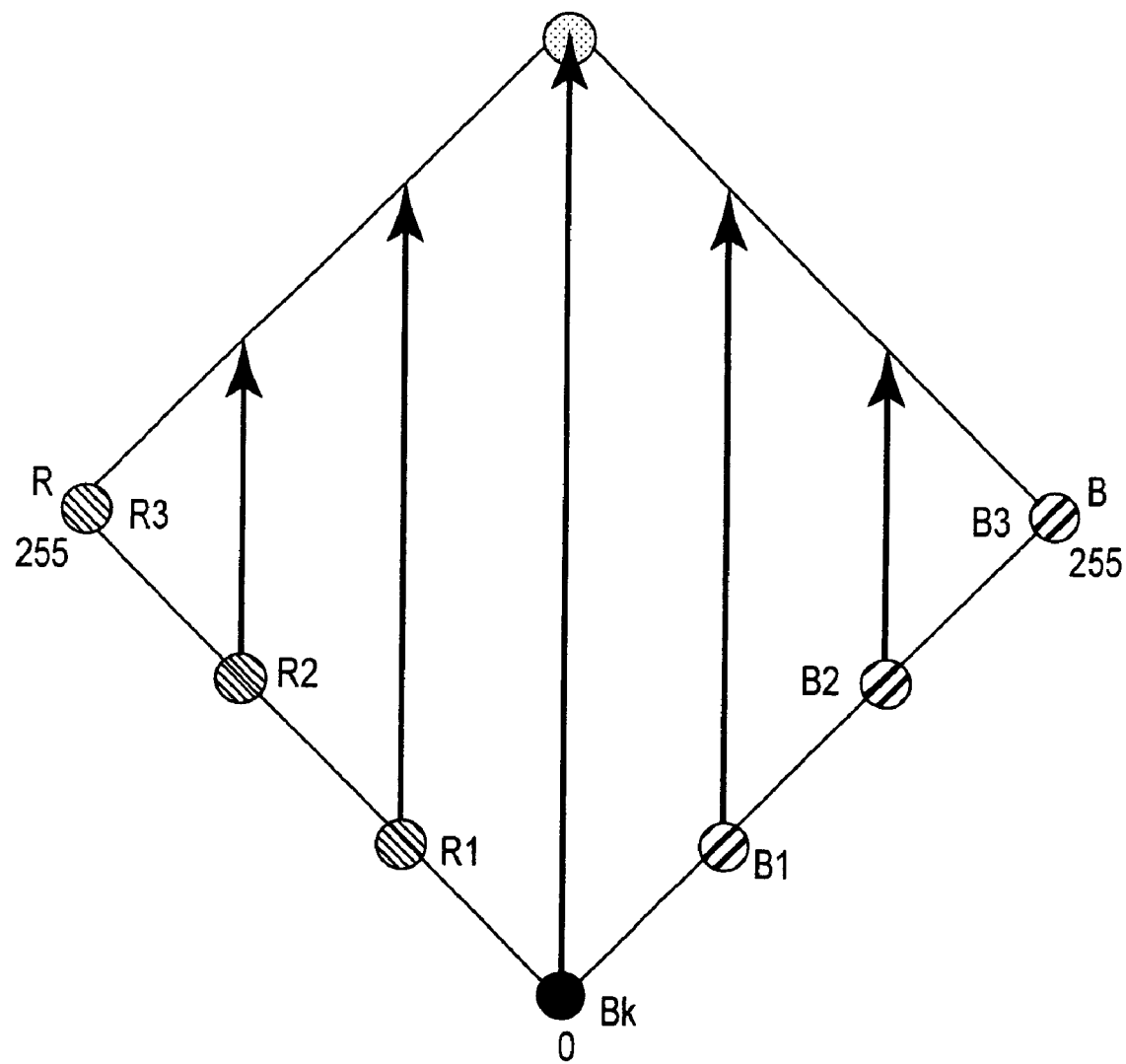

In FIG. 12, at the points R3 and B3, the corresponding two sub-pixels are placed in the red display state and the blue display state, respectively. At each of the points R1 and B1, the corresponding sub-pixel which is a smaller sub-pixel of the divided two sub-pixels is placed in a blue display state or a red display state, and the remaining larger sub-pixel is placed in a black display state. The large sub-pixel can assume continuous gradation color for magenta, so that it can be located at any point on each of the arrows extending from the points R1 and B1 in the RB synthetic vector direction. On a similar principle, it can also be located at any point on each of the arrows extending from the points R2 and B2 in the RB synthetic vector direction.

More specifically, the first sub-pixel provided with the magenta color filter is divided into two sub-pixels having different areas. At one of the divided two sub-pixels, the chromatic color of red or blue is displayed and at the other sub-pixel, a digital halftone magenta is displayed by effecting display for changing the brightness. At the green pixel, it is possible to continuously change the brightness. As a result of this display method, it is possible to effect color display.

Figure 13:
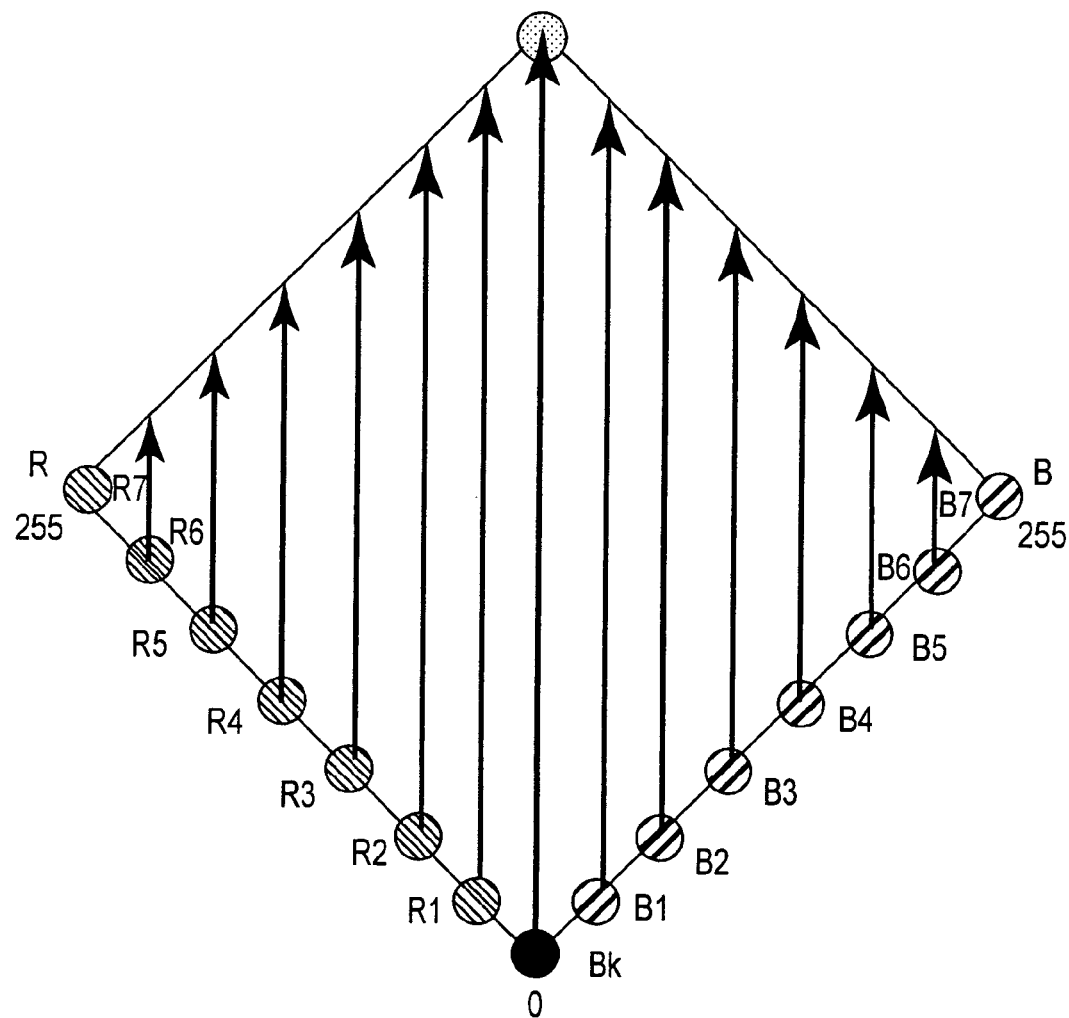

Further, on a similar principle, in the case where the pixel utilizing the coloring phenomenon based on ECB effect is divided into sub-pixels at an areal ratio of 1:2:4, available display colors are indicated by arrows in FIG. 13.

Generally, the first sub-pixel (utilizing the ECB effect-based coloring phenomenon) is provided with the magenta color filter and is divided into a plurality of sub-pixels having different areas. At a part of the sub-pixels, chromatic color of red or blue is displayed, and a remaining part of the sub-pixels, a digital halftone magenta is displayed by effecting display for changing the brightness.

As described above, as the number of divided sub-pixels is increased, the number of displayable colors in the RB plane is also increased. However, this method is based on the digital gradation, not the analog full-color display method. Accordingly, in order to realize the analog gradation, pixels (55 and 56 in FIG. 5(e)) provided with color filters of red and blue may be added. At each of these pixels, a continuous change in brightness of blue or red is achieved, so that the displayable color is represented by a variable magnitude vector in the axis-B direction or the axis-R direction in FIGS. 12 and 13. As a result, it is possible to display continuous gradation levels of red and blue. Accordingly, it becomes possible to complement portions other than the arrows shown in FIGS. 12 and 13, so that it is possible to represent all the points in the RB plane.

More specifically, the second sub-pixel (for only the brightness modulation) is divided into a plurality of sub-pixels including a part thereof provided with a green color filter and a remaining part provided with red and green color filters. At each of the divided sub-pixels the second sub-pixel, a change in brightness is achieved by performing modulation in the brightness change range, whereby continuous gradation is added to the above described display of the digital halftone magenta to effect display of arbitrary halftone in the RB plane. By combining this with continuous gradation of green, it is possible to effect full-color display.

The pixels, of the second sub-pixels, provided with the red and blue color filters are used to compensate the colors other than those of digital gradation of magenta displayed at the first sub-pixel, so that modulation may be performed so that the maximum brightness is substantially identical to a brightness at the minimum sub-pixel of the sub-pixels constituting the first sub-pixel described above. In this case, a size of each of the added pixels 55 and 56 provided with the color filters of red and blue, respectively is sufficient so long as it has an area comparable to that of a minimum-sized sub-pixel 54 of the above described divided sub-pixels 52, 53 and 54. More specifically, e.g., in FIG. 13, the displayable points indicated by circles extending from the point "Bk" to the point "R7" and from the point "Bk" to the point "B7" are located at the same spacing. Further, it is possible to utilize any point on the arrows extending from the respective circle points in the RB synthetic vectors. To such a color displayable constitution, the pixels 55 and 56, provided with the color filters of red and blue, each having the same area as the associated minimum-sized sub-pixel of the pixel-divided sub-pixels are added, whereby it is possible to effect the additive process at any point in a direction of each of arrows R-CF and B-CF shown in FIG. 14. As a result, it is possible to represent all the points in the RB plane, so that it becomes possible to effect complete analog full-color display.

Further, as described above, the size of the added pixels provided with the red color filter and the blue color filter is sufficient so long as it has the same area as the minimum-sized sub-pixel of the pixel-divided sub-pixels. For this reason, as the pixel division number is increased, it is possible to effectively alleviate the influence of a lowering in light utilization efficiency due to the use of the red and blue color filters. In other words, as the number of division of pixel utilizing the coloring phenomenon based on the ECB effect is increased, it becomes possible to realize a higher light utilization efficiency.

Figure 15:
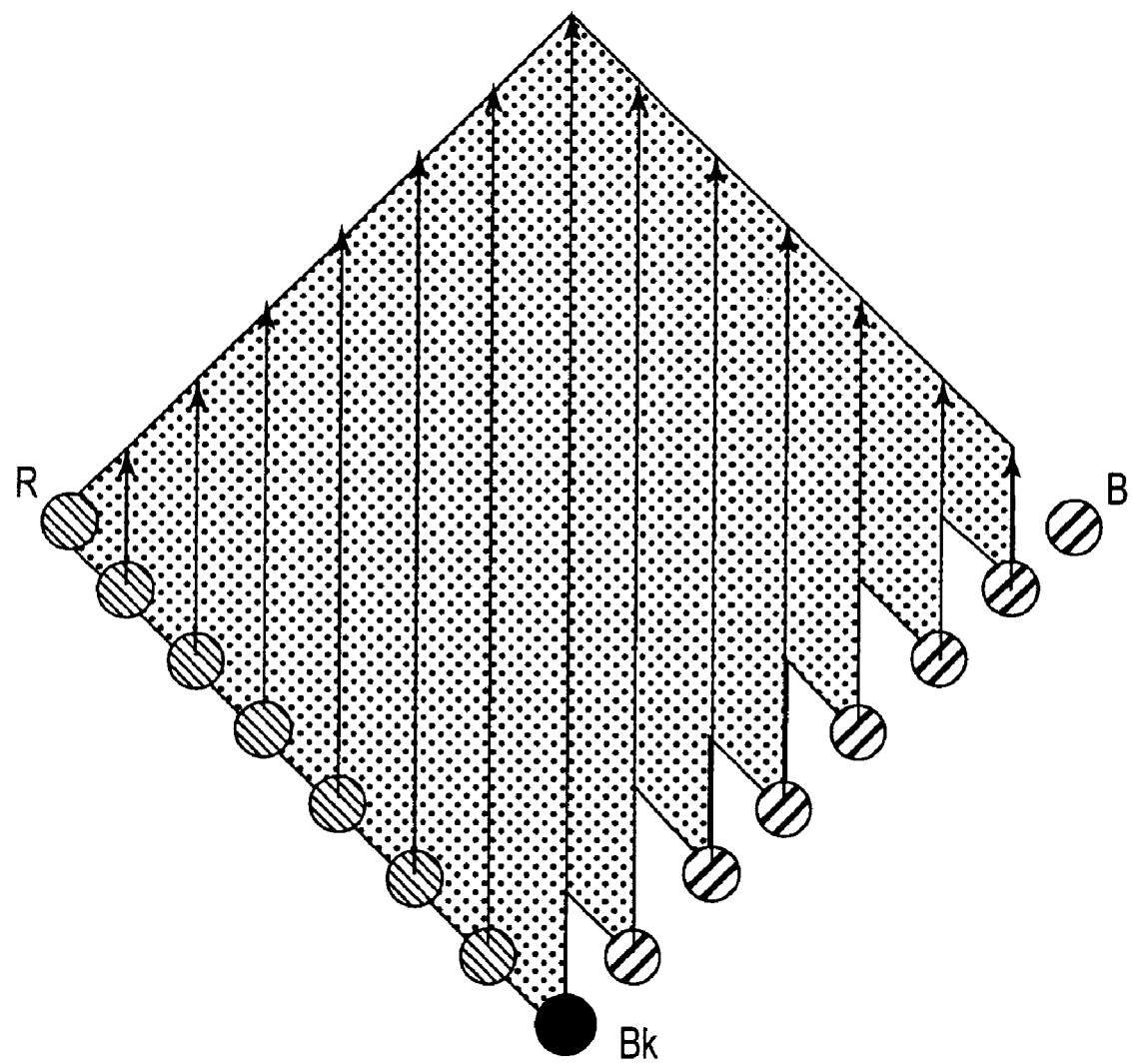

Incidentally, in the above embodiment, it is possible to achieve an effective result even when both of the red color filter and the blue color filter are not necessarily added. FIG. 5(f) shows such an embodiment in which only the pixel 56 provided with the red color filter is added. In FIG. 15, a displayable color range is indicated by dotted area when only the red color filter is added. In FIG. 15, in the red direction, all the colors are displayable but in the blue direction, there are colors which are not displayable. However, with respect to a human luminosity characteristic, blue is least sensitive, so that the number of necessary gradation levels is considered to be smallest. Accordingly, it is possible to obtain the display colors substantially comparable to full-color levels by adding only the red color filter.

Figure 14:
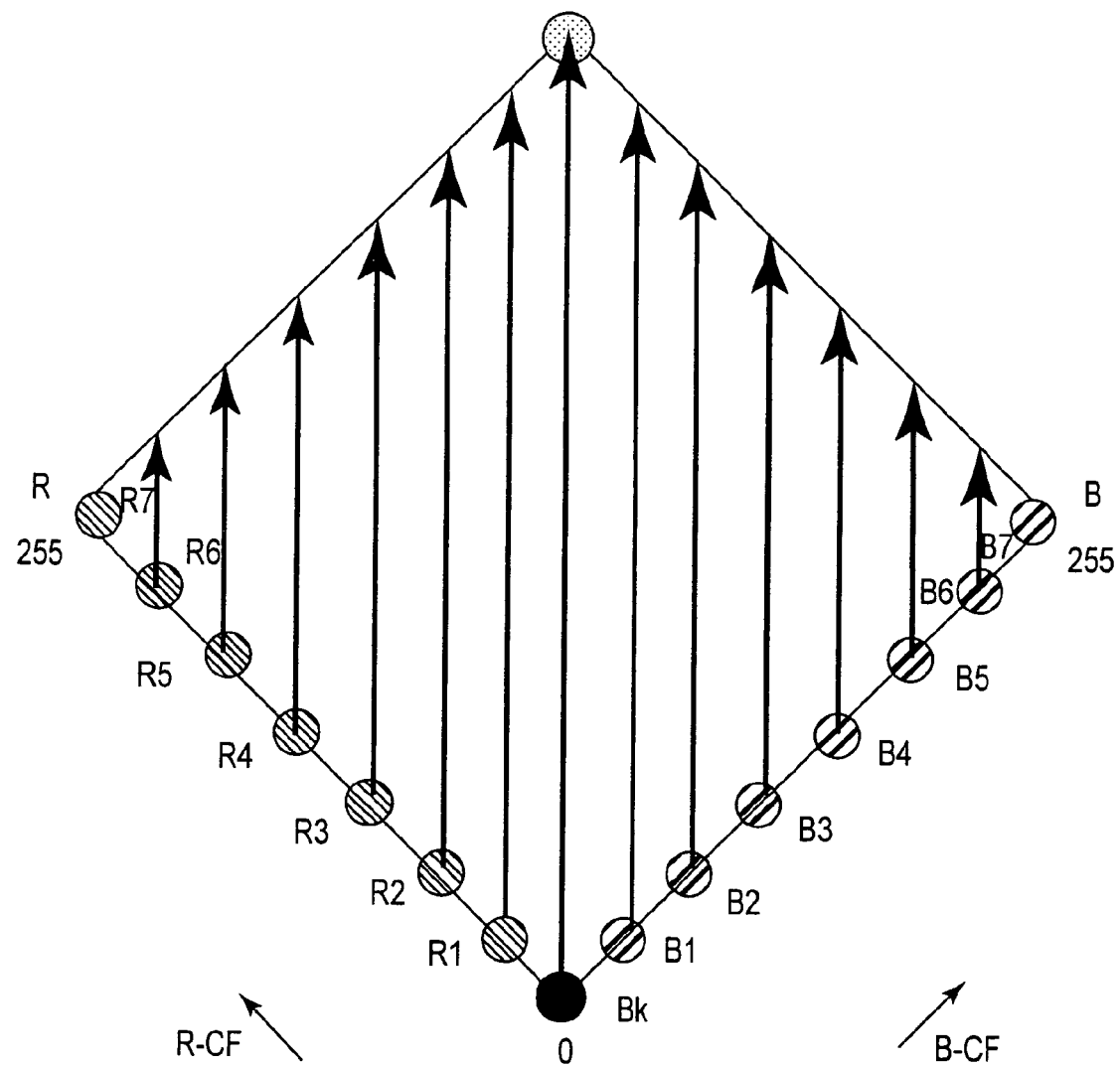

A constitution which is the same as that shown in FIG. 15 except that the referential point "Bk" is shifted to the position of the point "R1" in FIG. 14 may be used. As a result, it is possible to represent all the display colors. Incidentally, in this embodiment, the black display state provides a slightly reddish display color but such a method is applicable to the uses in which a contrast of the resultant display device e.g., as in the reflection-type display device is not severely required compared with the transmission-type display device.

By the above described methods, it becomes possible to display the display colors identical or comparable to the full color levels while retaining the high light utilization efficiency.

As described above, the color display used in the present invention can be used as both the transmission mode and the reflection mode and can realize the display device having high light utilization efficiency and less temperature dependency.

(Other Constitution Factors)

Incidentally, the liquid crystal display device of the present invention can be driven by any of a direct drive method, a simple matrix drive method, and an active matrix drive method.

In the present invention, the substrate used may be formed of glass or plastics. In the case of the transmission-type display device, both the pair of substrates are required to be light transmissive. On the other hand, in the case of the reflection-type display device, as a supporting substrate, it is also possible to use a substrate through which light does not pass.

Further, the substrate used may have flexibility.

In the case of using the reflection-type display device, it is possible to employ various reflection plates, such as so-called front scattering plate comprising a scattering plate which is provided with a mirror reflection plate as a reflection plate and disposed outside the liquid crystal layer, or a so-called directional pixel plate having directivity by appropriately shaping a reflection surface.

Hereinbelow, the present invention will be described more specifically based on Examples.

(Common Device Constitution)

In the following Comparative Examples and Examples, a common device structure is as follows.

Figure 6:
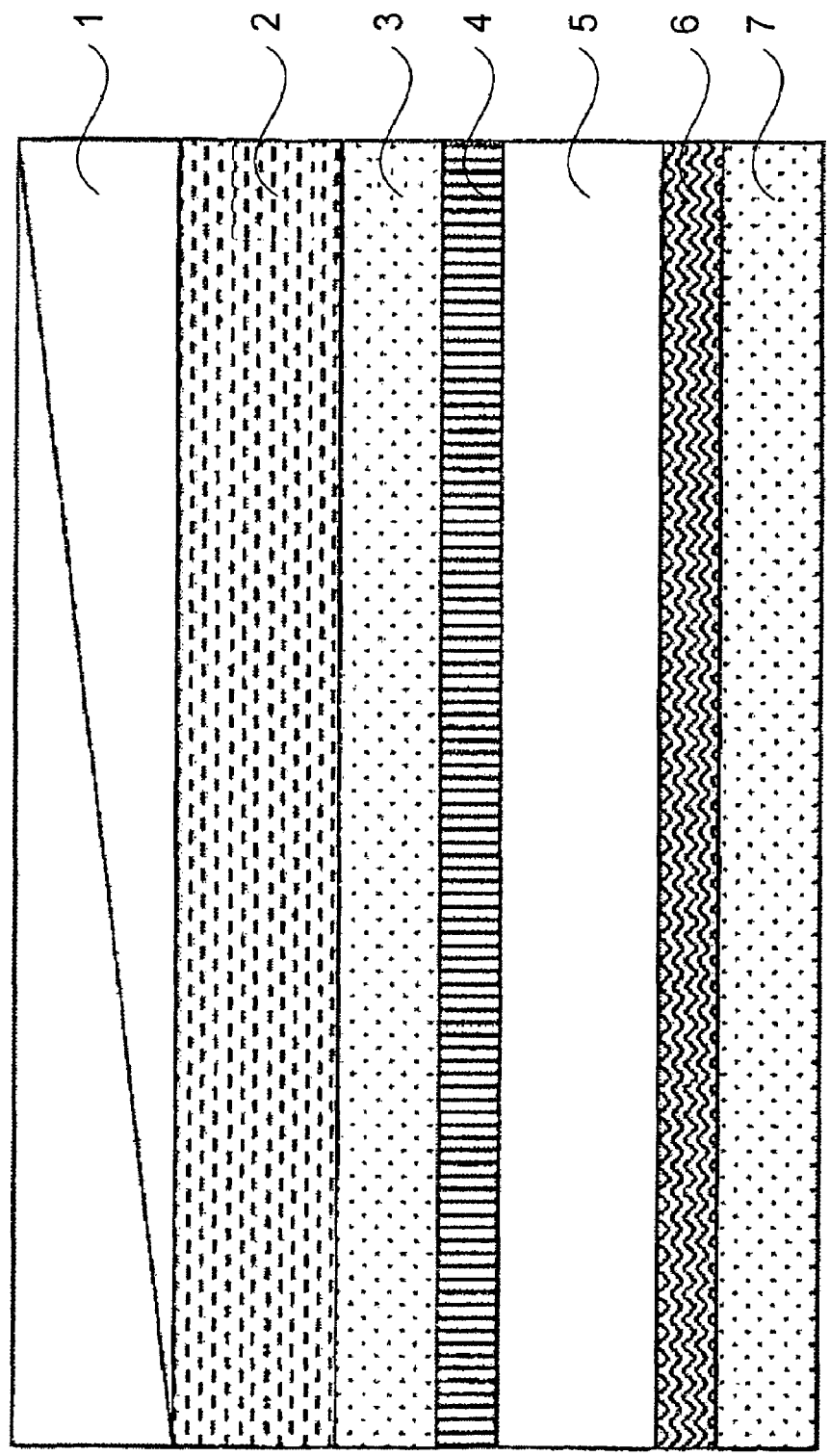
FIG. 6 is an explanatory view of a layer structure of the liquid crystal display device of the present invention.

A basis constitution of a liquid crystal layer structure was the same as that shown in FIG. 6. More specifically, two (upper and lower) glass substrates 3 and 7 subjected to homeotropic (vertical) alignment treatment were applied to each other with a spacing to prepare a cell. At that time, the upper and lower substrates were subjected to rubbing treatment so as to provide a rubbing axes which were parallel with each other but different in their directions (anti-parallel relationship). A pretilt angle was adjusted to 1 degree from a direction perpendicular to the substrate (89 degrees from a horizontal direction). Into the spacing of the cell, a liquid crystal material (Model: "MLC-6882", mfd. by Merck & Co., Inc.) having a negative dielectric anisotropy ($-\Delta\epsilon$) was injected so that a cell thickness was changed to provide an optimum retardation in each example. Further, a constitutional ratio of the liquid crystal material was adjusted depending on the examples.

As the substrate structure used, one of the substrates (substrate 7) was an active matrix substrate provided with thin film transistors (TFTs) and the other substrate 3 was a color filter substrate provided with color filters, as desired depending on the examples.

A shape of pixels and a color filter constitution were changed appropriately depending on each example.

The color filter substrate 3 was provided with a transparent electrode as an electrode 4.

As a pixel electrode 6 on the TFT side, an aluminum electrode was used to provide a reflection-type constitution.

Between an upper substrate 3 (color filter substrate) and a polarization plate 1, a wide-band $\lambda/4$ plate 2 (phase-compensation plate capable of substantially satisfying $\frac{1}{4}$ wavelength condition in visible light region) was disposed, thereby to provide such a normally black constitution that a dark state is given under no voltage application and a bright state is given under voltage application when reflection-type display is effected.

(Material Characteristic)

By using a Berek-type compensator under a polarizing microscope, a voltage dependence of $\Delta n_{\it eff}$ referred to herein was measured while changing a temperature in the range of 0-40° C. At that time, no chiral agent (dopant) was added to the liquid crystal material (MLC-6882).

Figure 7:
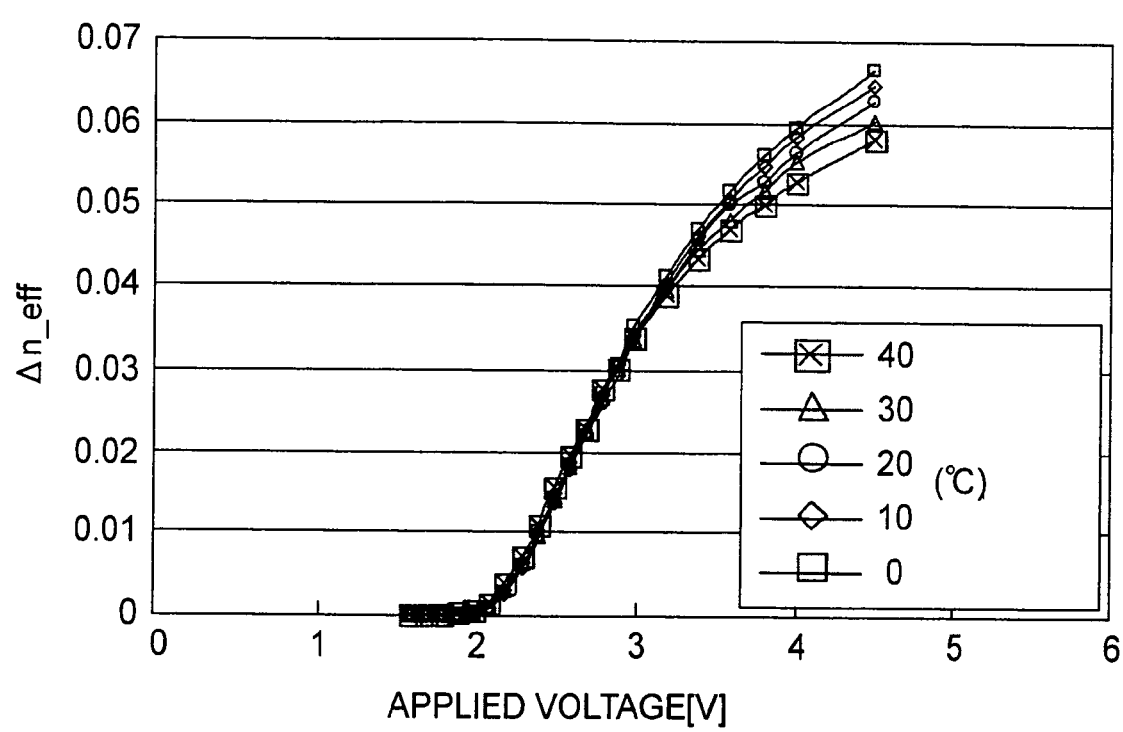
FIG. 7 is a graph showing a voltage-dependence of an effective birefringence amount when a temperature is changed with respect to a liquid crystal material used in Comparative Examples.

A result is shown in FIG. 7, wherein a relationship between an applied voltage and $\Delta n_{\it eff}$ at each of temperatures of 0° C., 10° C., 20° C., 30° C. and 40° C.

From the result of FIG. 7, it is found that there is no temperature dependence in the $\Delta n_{\it eff}$ range from 0 to about 0.03. Incidentally, the measurement was performed by using a liquid crystal cell having a cell thickness of 5 microns. Even when the cell thickness was changed, there was substantially no change in voltage dependence of $\Delta n_{\it eff}$.

Comparative Example 1

For comparison, an active matrix liquid crystal display device (panel) having a diagonal length of 12 inches and pixels of 600×800×3 (RGB) was used. Each of the pixels had a size of about 100 microns (row)×about 300 microns (column) and was not provided with a color filter. A liquid crystal layer was controlled to have a thickness of 10 microns.

The thus prepared liquid crystal display device was subjected to image formation while variously changing a voltage at an environmental temperature of 25° C. As a result, under no voltage application, a black display state was obtained. Further, a white display state providing a maximum reflectance was obtained at about 2.55 V, and a red display state was obtained at 2.85 V with a somewhat poor color purity, and a blue display state was obtained at 3 V.

Further, when the environmental temperature was changed variously from 0° C. to 35° C., there was no change in display state. As a result, it was possible to obtain a stable characteristic with respect to a change in temperature.

However, when a motion picture image or a scrolling image was displayed at a temperature of about 25° C., image blur occurred considerably, thus adversely affecting practical use of the display device.

Comparative Example 2

A liquid crystal display device was prepared in the same manner as in Comparative Example 1 except that the cell thickness was adjusted to 5 microns.

The thus prepared liquid crystal display device was subjected to image formation while variously changing a voltage at an environmental temperature of 25° C. As a result, under no voltage application, a black display state was obtained. Further, a white display state providing a maximum reflectance was obtained at about 3.0 V, and a red display state was obtained at 3.9 V with a somewhat poor color purity, and a blue display state was obtained at 5 V.

Further, when the environmental temperature was changed variously from 0° C. to 35° C., there was no change at all in white display state, black display state, and their halftone display state. As a result, it was possible to obtain a stable characteristic with respect to a change in temperature. However, with respect to the blue and red display states, they were somewhat changed with the change in temperature, so that the resultant color image was not stable against temperature.

However, when a motion picture image or a scrolling image was displayed at a temperature of about 25° C., display was effected with no problem, thus being practically of no problem.

Example 1

A liquid crystal display device was prepared in the same manner as in Comparative Example 2 except that the liquid crystal material was changed.

As the liquid crystal material in this example, a liquid crystal material prepared by adding 0.2 wt. % of a chiral agent (dopant) ("S-811", mfd. by Merck & Co., Ltd.) to the liquid crystal material (MLC-6882), as a base liquid crystal, used in Comparative Examples 1 and 2 was used. The chiral agent (S-811) has a helical structure in a counterclockwise direction, and a helical patch was such that it was increased with temperature rise.

The thus prepared liquid crystal display device was subjected to image formation while variously changing a voltage at an environmental temperature of 25° C. As a result, desired display states were obtained under the substantially same condition as in Comparative Example 2. More specifically, under no voltage application, a black display state was obtained. Further, a white display state providing a maximum reflectance was obtained at about 3.0 V, and a red display state was obtained at 3.9 V with a somewhat poor color purity, and a blue display state was obtained at 5 V.

Further, when the environmental temperature was changed variously from 0° C. to 35° C., there was no change at all in white display state, black display state, and their halftone display state. As a result, it was possible to obtain a stable characteristic with respect to a change in temperature. Further, different from Comparative Example 2, also with respect to the blue and red display states, they were stable against the temperature change, thus providing a good temperature dependency.

On the other hand, when a motion picture image or a scrolling image was displayed at a temperature of about 25° C., display was effected with no problem, thus being practically of no problem.

With respect to the chiral liquid crystal (agent) used in this example (and the following examples), it is difficult to measure the voltage dependence of $\Delta n_{eff}$ as shown in FIG. 7 due to the presence of the chiral component in some cases. For this reason, in the examples using the chiral liquid crystal (agent), only hue was evaluated.

Example 2

A liquid crystal display device was prepared in the same manner as Example 1 except that the liquid crystal material was changed.

As the liquid crystal material in this example, a liquid crystal material prepared by adding 0.2 wt. % of a chiral agent (dopant) ("R-811", mfd. by Merck & Co., Ltd.) to the liquid crystal material (MLC-6882), as a base liquid crystal, used in Comparative Examples 1 and 2 was used. The chiral agent (R-811) has a helical structure in a clockwise direction, and a helical patch was such that it was increased with temperature rise.

The thus prepared liquid crystal display device was subjected to image formation while variously changing a voltage at an environmental temperature of 25° C. As a result, desired display states were obtained under the substantially same condition as in Comparative Example 2. More specifically, under no voltage application, a black display state was obtained. Further, a white display state providing a maximum reflectance was obtained at about 3.0 V, and a red display state was obtained at 3.9 V with a somewhat poor color purity, and a blue display state was obtained at 5 V.

Further, when the environmental temperature was changed variously from 0° C. to 35° C., there was no change at all in white display state, black display state, and their halftone display state. As a result, it was possible to obtain a stable characteristic with respect to a change in temperature. Further, different from Comparative Example 2, also with respect to the blue and red display states, they were stable against the temperature change, thus providing a good temperature dependency.

On the other hand, when a motion picture image or a scrolling image was displayed at a temperature of about 25° C., display was effected with no problem, thus being practically of no problem.

As a result, it was confirmed that good results were attained irrespective of the direction of helical structure.

Comparative Example 3

A liquid crystal display device was prepared in the same manner as Example 1 except that the liquid crystal material was changed.

As the liquid crystal material in this example, a liquid crystal material prepared by adding 1 wt. % of a chiral agent (dopant), having a chemical structure shown below, as described in JP-A No. Hei 05-093923 to the liquid crystal material (MLC-6882), as a base liquid crystal, used in Comparative Examples 1 and 2 was used. The chiral agent (S-811) has a helical patch which was decreased with temperature rise.

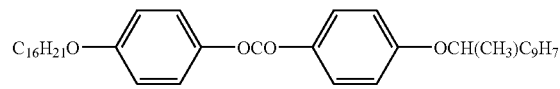

The thus prepared liquid crystal display device was subjected to image formation while variously changing a voltage at an environmental temperature of 25° C. As a result, desired display states were obtained under the substantially same condition as in Comparative Example 2. More specifically, under no voltage application, a black display state was obtained. Further, a white display state providing a maximum reflectance was obtained at about 3.0 V, and a red display state was obtained at 3.9 V with a somewhat poor color purity, and a blue display state was obtained at 5 V.

Further, when the environmental temperature was changed variously from 0° C. to 35° C., with respect to the blue and red display states, they were somewhat changed with the change in temperature, so that the resultant color image was not stable against temperature. Further, the brightness in the white display state and the halftone display characteristic were also changed somewhat, thus resulting in unstable display characteristics with respect to temperature.

As a result, it was found that the temperature dependence was adversely affected in the case where the chiral agent used had such a helical pitch that a temperature dependence thereof was opposite to those in Examples 1 and 2, i.e., that it was decreased with temperature rise.

Example 3

A liquid crystal display device was prepared in the same manner as in Example 1 except that the pixel structure was changed.

More specifically, one pixel unit was constituted by three pixels including one pixel provided with a green color filter and other two pixels which were not provided with a color filter and were disposed at an areal ratio of 1:2.

As a result, it was possible to effect gradation display of continuous gradation colors of green and monochromatic color and 4 gradation-level display of red and blue, thus effecting a natural picture image although there was slight granuality. Further, the natural picture image was displayed with no problem even when the environmental temperature was changed.

Example 4

A liquid crystal display device was prepared in the same manner as in Example 3 except that the pixel structure was changed.

More specifically, one pixel unit was constituted by three pixels including one pixel provided with a green color filter and other two pixels which were provided with a magenta color filter and were disposed at an areal ratio of 1:2.

As a result, it was possible to effect gradation display of continuous gradation colors of green, magenta and monochromatic color and 4 gradation-level display of red and blue with high color purity, thus effecting a natural picture image although there was slight granuality. Further, the natural picture image was displayed with no problem even when the environmental temperature was changed.

Example 5

A liquid crystal display device was prepared in the same manner as in Example 1 except that the pixel structure was changed.

More specifically, one pixel unit was constituted by three pixels including one pixel provided with a green color filter, one pixel provided with a red color filter, and pixel provided with a blue color filter, and other three pixels which were provided with a magenta color filter and were disposed at an areal ratio of 1:2:4.

As a result, it was possible to effect gradation display of continuous gradation colors with respect to all the display colors, thus effecting a natural picture image of complete full colors. Further, the natural picture image was displayed with no problem even when the environmental temperature was changed.

As described hereinabove, according to Examples of the present invention, it becomes possible to realize a color liquid crystal display device with loss temperature dependence.

In the above described Examples, the active matrix substrate (provided with TFT) is used as a drive substrate. However, in the present invention, the TFT may be replaced with MIM (metal-insulator-metal), and the substrate may be changed to a semiconductor substrate on which a switching element is formed. Further, the active-matrix driving method may be changed to a simple-matrix driving method or a plasma-addressing driving method.

Further, in the above described Examples, the liquid crystal display device of the reflection type is used. However, the liquid crystal display device may also be applicable to those of a transmission-type or a transflective (semitransmission)-type.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 137505/2004 filed May 6, 2004, which is hereby incorporated by reference.

What is claimed is:

1. A color liquid crystal display device, comprising:
   a pair of oppositely disposed substrates each of which is provided with an electrode and has been subjected to homeotropic alignment treatment; and
   a chiral nematic liquid crystal disposed between said pair of oppositely disposed substrates,
   wherein said chiral nematic liquid crystal is aligned homeotropically with respect to the substrates when a voltage is not applied between the electrodes, and is aligned twistedly in an angle between the substrates effecting birefringence of said chiral nematic liquid crystal when a voltage is applied between the electrodes, and
   wherein said chiral nematic liquid crystal has a temperature range in which a helical pitch of said chiral nematic liquid crystal is increased while a local refractive index anisotropy of said chiral nematic liquid crystal is decreased with temperature rise, and the angle of twisted alignment is reduced by the increase of the helical pitch to increase an effective refractive anisotropy so as to offset decrease of birefringence caused by the decrease of the local refractive index anisotropy of said chiral nematic liquid crystal with temperature rise.

2. A device according to claim 1, wherein said device effects a black display in a no voltage application state.

3. A device according to claim 1, wherein said device further comprises a circular polarization plate.

4. A device according to claim 1, wherein a unit pixel comprises a plurality of sub-pixels which includes a first sub-pixel for displaying chromatic color by birefringence of said chiral nematic liquid crystal under voltage application and a second sub-pixel having a color filter for displaying color of the color filter in a brightness change range of said chiral nematic liquid crystal under voltage application.

* * * * *